(12) United States Patent
Shiobara et al.

(10) Patent No.: US 7,747,700 B2
(45) Date of Patent: Jun. 29, 2010

(54) SYSTEM AND METHOD FOR REFERENCING AV DATA ACCUMULATED IN AV SERVER

(75) Inventors: Toshimitsu Shiobara, Tokyo (JP); Takayuki Gouhara, Kanagawa (JP); Tomoe Ando, Kanagawa (JP); Shinichi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 10/535,841

(22) PCT Filed: Nov. 20, 2003

(86) PCT No.: PCT/JP03/14847

§ 371 (c)(1),
(2), (4) Date: Apr. 10, 2006

(87) PCT Pub. No.: WO2004/049709

PCT Pub. Date: Jun. 10, 2004

(65) Prior Publication Data

US 2006/0224698 A1    Oct. 5, 2006

(30) Foreign Application Priority Data

Nov. 22, 2002 (JP) .............................. 2002-339687
Nov. 26, 2002 (JP) .............................. 2002-342971
Dec. 16, 2002 (JP) .............................. 2002-364289
Mar. 10, 2003 (JP) .............................. 2003-063980

(51) Int. Cl.
*G06F 15/16* (2006.01)
(52) U.S. Cl. ....................................... 709/219; 345/418
(58) Field of Classification Search .................. 709/217, 709/219; 345/418
See application file for complete search history.

(56) References Cited

U.S. PATENT DOCUMENTS 4,742,447 A * 5/1988 Duvall et al. .................. 718/1

(Continued)

FOREIGN PATENT DOCUMENTS

EP        711073 A3    9/1999

(Continued)

OTHER PUBLICATIONS

Sweeney, Adam, Scalability in the XFS File System, Jan. 1996, USENIX 1996 Annual Technical Conference.*

(Continued)

*Primary Examiner*—Ario Etienne
*Assistant Examiner*—Clayton R Williams
(74) *Attorney, Agent, or Firm*—Rader, Fishman & Grauer PLLC

(57) ABSTRACT

A system in which AV data stored in an AV server is previewed by a plurality of edit terminals includes a recording apparatus which is connected to those edit terminals and which is capable of higher speed access than a recording element in the AV server, and a first processing element which makes a request to transfer AV data from the AV server to the recording apparatus and a second processing element which previews AV data from the recording apparatus are provided for each of the edit terminals. Accordingly, a material stored in the AV server can be previewed by the plurality of edit terminals simultaneously in parallel without being limited to the number of the input and output ports of the AV server, and the waiting time becomes short when the edit terminal previews the material stored in the AV server.

13 Claims, 16 Drawing Sheets

U.S. PATENT DOCUMENTS

| | | | | |
|---|---|---|---|---|
| 5,249,271 | A * | 9/1993 | Hopkinson et al. | 710/57 |
| 5,611,049 | A * | 3/1997 | Pitts | 707/8 |
| 5,828,841 | A | 10/1998 | Ito et al. | |
| 5,852,435 | A * | 12/1998 | Vigneaux et al. | 345/428 |
| 6,005,678 | A * | 12/1999 | Higashida et al. | 358/452 |
| 6,211,869 | B1 * | 4/2001 | Loveman et al. | 715/723 |
| 6,414,725 | B1 * | 7/2002 | Clarin et al. | 348/714 |
| 6,446,141 | B1 * | 9/2002 | Nolan et al. | 710/8 |
| 6,757,705 | B1 * | 6/2004 | Pardikar et al. | 709/203 |
| 7,216,203 | B1 * | 5/2007 | Bagewadi | 711/137 |

FOREIGN PATENT DOCUMENTS

| | | |
|---|---|---|
| JP | 10-285537 A | 10/1998 |
| JP | 2002-300523 A | 10/2002 |

OTHER PUBLICATIONS

International Search Report mailed Mar. 2, 2004.

* cited by examiner

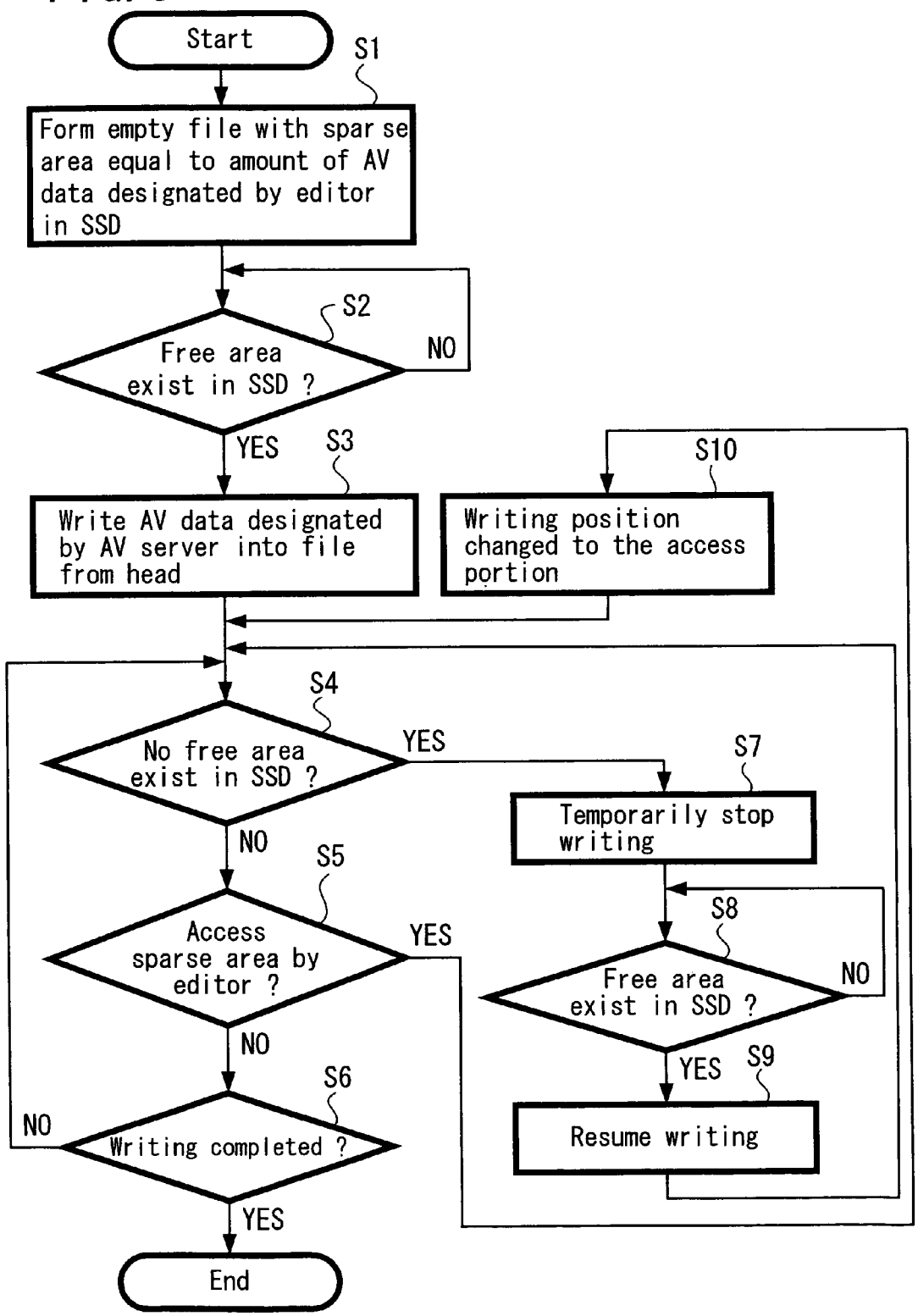

SYSTEM AND METHOD FOR REFERENCING AV DATA ACCUMULATED IN AV SERVER

TECHNICAL FIELD

The present invention relates to a system and a method in which a material stored in an AV server is previewed by a plurality of edit terminals.

BACKGROUND ART

Recently, in broadcast stations, AV (Audio and/or Video) data as a material has been stored generally in an AV server having large capacity.

An AV server generally has RAID (Redundant Arrays of Inexpensive Disks) including a plurality of hard-disk drives, and has a plurality of input and output ports such as SDI (Serial Digital Interface) ports.

AV data sent to an AV server from outside (from a VTR in a broadcast station, a video camera of on-the-spot coverage connected to the broadcast station by the wide area network and so on) is input into one of input and output ports, and compression processing and the like is performed at the input and output port. Then, the data is sent to the RAID and is recorded in the RAID.

Further, AV data read out from the RAID and sent to one of input and ports is subject to expansion processing and the like. Then, the data is output from the input and output port and is sent to the outside (such as a computer for broadcasting, a backup computer and so on) from the AV server.

Hereupon, usually in the broadcast station, instead of transmitting a material stored in the AV server without any change when broadcasting, an edited result (namely, a complete package) of the material edited by an edit terminal (non-linear edit apparatus) is transmitted.

In related art, as a method to preview (read out) a material stored in the AV server to be edited, an input and output port of the AV server and an edit terminal are made to correspond to one by one and are connected, for example, and the material is directly previewed from the AV server through the connected input and output port (for example, refer to Japanese Patent Application No. H8-221951 published by Japan Patent Office, paragraphs 0003 to 0006 and FIG. 3).

However, in this method, because an input and output port of an AV server and an edit terminal are made to correspond to one by one and are connected, there was an inconvenience that the number of edit terminals that can preview the material stored in the AV server simultaneously in parallel is limited to the number of input and output ports of the AV server.

In a broadcast station, various kinds of and a large amount of materials stored in an AV server are often edited simultaneously in parallel in a plurality of edit terminals. In that case, it is extremely inconvenient that the number of edit terminals which can preview the material simultaneously in parallel is restricted as described above.

In addition, since AV data is dispersed and recorded in a plurality of hard disks in the RAID inside the AV server, there was such an inconvenience in this method that waiting time becomes long, when a large amount of AV data is previewed or AV data of random frames is previewed by an edit terminal,.

In editing work, after previewing by an edit terminal the whole of a certain large amount of AV data (AV data stored in an AV server after sent from a video camera of on-the-spot coverage to the broadcast station through a wide area network) as a material for edit, a portion necessary for the edit in the AV data may be determined. Further, AV data of random frames may be previewed by the edit terminal when editing (IN and OUT points are determined and modified, while viewing the video by frames and skipping frames). In those cases, it is much inconvenient that waiting time becomes long.

In light of the above, the present invention is to make a plurality of edit terminals preview a material stored in an AV server simultaneously in parallel without being restricted by the number of input and output ports of an AV server, and to make the waiting time short when an edit terminal previews a material stored in an AV server.

DISCLOSURE OF THE INVENTION

In order to resolve the above inconveniences, applicants of the present invention provide a preview system, in a system in which a plurality of edit terminals preview AV data stored in an AV server, including a recording apparatus connected to those edit terminals and capable of performing higher speed access than recording means inside the AV server, and wherein each edit terminal includes first processing means which makes a request to transfer AV data to the recording apparatus from the AV server, and second processing means which previews AV data from the recording apparatus.

In this preview system, a recording apparatus capable of performing higher speed access than recording means in an AV server is connected to a plurality of edit terminals.

Further, in each edit terminal, the first processing means makes a request to transfer AV data to this recording apparatus from the first AV server, and the second processing means previews the AV data from this recording apparatus.

Therefore, AV data stored in the AV server can be previewed from this recording apparatus by each edit terminal. Accordingly, a material stored in the AV server can be previewed simultaneously in parallel by a plurality of edit terminals without being restricted by the number of input and output ports of the AV server, differently from the case in which an input and output port and an edit terminal are made to correspond to one by one and are connected.

Furthermore, because this recording apparatus is capable of performing higher speed access than recording means in the AV server, waiting time for an edit terminal previewing AV data of random frames at the time of editing becomes shorter than the waiting time for directly previewing AV data of random frames from an AV server.

Accordingly, waiting time for an edit terminal previewing a material stored in an AV server becomes also short.

Further, as an embodiment in this preview system, it is preferable that the system further includes a second AV server which compresses and stores the same AV data as this AV server (as a first AV server) with the higher compressibility than the first AV server; that each edit terminal includes third processing means that previews AV data from this second AV server; and that based on the fact that a necessary portion for the edit was determined from among AV data previewed by the third processing means, the first processing means of each edit terminal makes a request to transfer AV data of the determined portion from the first AV server to this recording apparatus.

Accordingly, because the whole material to be edited (a material for determining a necessary portion for the edit) may be previewed from the second AV server that has the higher compressibility (low resolution) than the first AV server, the waiting time becomes shorter than that when directly previewing the material from the first AV server.

Further, because only AV data of the necessary portion for the edit that was determined from the previewed whole material needs to be transferred from the first AV server to this recording apparatus, time required for the transfer is short differently from the case in which the whole material to be edited is transferred from the first computer to this recording apparatus.

Therefore, waiting time becomes further short when previewing the material stored in the first AV server using the edit terminal.

Further, as an example, it is preferable that this preview system includes the recording apparatus having a plurality of fiber channel ports and further includes a gateway terminal which is connected to the recording apparatus and also the first AV server and which transfers AV data from the first AV server to the recording apparatus based on a request from the second processing means in the edit terminal, and the second processing means in each edit terminal sends a request to the gateway terminal.

Accordingly, because the sending and receiving of AV data are performed among the gateway terminal, the recording apparatus and the edit terminal by the fiber channels, more numbers of the edit terminals can preview AV data stored in the first AV server simultaneously in parallel through the network connection utilizing characteristics of the fiber channel.

Further, in the case where the sending and receiving of AV data are performed among a gateway terminal, a recording apparatus and an edit terminal by a fiber channel, as an example, it is preferable that the gateway terminal makes information indicating a portion of a file in which AV data was written recorded into the file to which the recording apparatus writes AV data, and the third processing means in each edit terminal previews AV data of the portion that was indicated by the information in that file.

Accordingly, when AV data is previewed from the recording apparatus by the edit terminal while the recording apparatus is writing AV data into the file, such an inconvenience as previewing a portion to which AV data has not been written into the file yet (skip reading) can be prevented.

Further, as an example, it is preferable in this preview system that this recording apparatus is connected to a plurality of edit terminals, and the first processing means in each edit terminal makes a request to transfer AV data from the input and output port of the AV server to the recording apparatus.

Accordingly, since the AV server transfers AV data from one synchronous input and output port of the AV server to the recording apparatus, the plurality of edit terminals can preview AV data stored in the AV server simultaneously in parallel from the recording apparatus. Therefore, the number of edit terminals that are more than the number of the synchronous input and output ports of the AV server can preview AV data stored in the AV server simultaneously in parallel.

Further, because AV data is output from the synchronous input and output port (is not transmitted from a network interface by a file transfer protocol), AV data can be followed and reproduced from the AV server and be read in the edit terminal.

Further, as an example, it is preferable that this preview system includes: the recording apparatus having a sparse function; first control means which controls the recording apparatus to make an empty file having a sparse area that is the same amount as the data amount of designated AV data, based on the fact that AV data for the edit from among the AV data stored in the AV server was designated by the edit terminal; second control means which controls the AV server to reproduce the designated AV data and to send the data to the recording apparatus, and to temporarily stop reproduction in response to no free area existing in the recording apparatus and to resume reproduction in response to a free area again existing in the recording apparatus; third control means which controls the recording apparatus to make AV data transmitted from the AV server written into that file, and to temporarily stop writing in response to no free area existing in the recording apparatus and to resume writing in response to a free area again existing in the recording apparatus; and fourth control means which controls the recording apparatus to make a portion in which other AV data than the relevant range in that file is written into a sparse area, based on the fact that a necessary extent for the edit out of AV data which was written into the file in the recording apparatus is determined by the edit terminal.

Accordingly, in the case where the various kinds of AV data to be edited exist, when various kinds of AV data are designated by the edit terminal respectively, with respect to those various kinds of AV data, an empty file having a sparse area that is the same amount as the data amount of the AV data is respectively made in the recording apparatus by the first control means. (at this point, the sum of the logic size of those files becomes equal to the sum of amount of those various kinds AV data, however, because the sum of the physical size of those files is zero, all of those files can exist in the recording apparatus.) Then, by the second control means and third control means, those various kinds of AV data are reproduced in the AV server respectively and transmitted to the recording apparatus, and are written into corresponding files in the recording apparatus.

When the sum of the physical size of the file (a total data amount of AV data that was written into the file) has reached to the capacity of this recording apparatus and no free area existing in the recording apparatus, while AV data of any kinds is written into the file, the reproducing and writing of the AV data is temporarily stopped by the second and third control means. However, AV data written into the other file is read out from the recording apparatus and the necessary portion for the edit of the AV data is determined by the edit terminal, then a portion in which other AV data than the portion to be edited (data unnecessary for the edit) in the file in the recording apparatus is made to be a sparse area by the fourth control means, and therefore, a total of the physical size of the files decrease only by the data amount of AV data of the portion made to the sparse area, and a free area is again generated in the recording apparatus. Hence, the reproducing and writing of AV data that was temporarily stopped is resumed by the second and third control means.

As described above, because each kind of AV data designated by the edit terminal among the AV data stored in the AV server is copied respectively as a sparse file, various kinds of AV data for the edit among AV data stored in the AV server can be copied into the recording apparatus of a small capacity.

Further, even if no free capacity exists in the recording apparatus while copying, free capacity in the recording apparatus increases automatically and promptly by making a portion in which AV data unnecessary for the edit among the sparse files into a sparse area, and the copying is resumed.

Therefore, various kinds of AV data stored in the AV server to be edit are copied into the recording apparatus of the small capacity to be previewed efficiently.

Further, as an example, it is preferable in this preview system that the recording apparatus includes: a plurality of input and output interfaces; a semiconductor memory; memory control means which controls the semiconductor memory; processing means which accesses the converted physical address area of the semiconductor memory through the memory control means, after converting a logical address to a physical address of the semiconductor memory based on the fact that an access request that designated the logical address was input to the input and output interfaces; wherein, each edit terminal and transfer means that transfers AV data stored in the AV server to the recording apparatus are connected to separate input and output interfaces, respectively and the access request designating a logical address is transmitted to the recording apparatus.

Accordingly, based on the access request designating each logic address from the transfer means and each of the edit terminals that were connected to this recording apparatus, the recording apparatus converts those logic addresses to the physical addresses not duplicated with each other and data can be written thereto, so that the destruction of data can be prevented without providing a computer that controls the access to the recording apparatus by the transfer means and each of the edit terminals.

Therefore, AV data can be previewed promptly in each of the edit terminals without the system being enlarged and complicated.

Next, applicants of the present invention provide a preview method, in a method in which AV data stored in an AV server is previewed by a plurality of edit terminals, including a first step of each edit terminal requesting, a recording apparatus capable of performing higher speed access than recording means in the AV server and connected to an edit terminal, to transfer AV data from the AV server, and a second step of previewing the AV data from the recording apparatus.

According to this preview method, completely the same as the preview system according to the above-described present invention, material stored in the AV server can be previewed simultaneously in parallel by a plurality of edit terminals without being restricted to the number of input and output ports in the AV server, and waiting time when an edit terminal previews the material stored in the AV server becomes short.

BRIEF DESCRIPTION OF DRAWINGS

FIG. 9 is a flow chart showing the processing by material management software in the edit terminals of FIG. 1 or FIG. 4;

BEST MODE FOR CARRYING OUT THE INVENTION

Hereinafter, the present invention will be explained specifically with reference to the drawings.

An Embodiment of the Preview System According to the Present Invention

Figure 1:
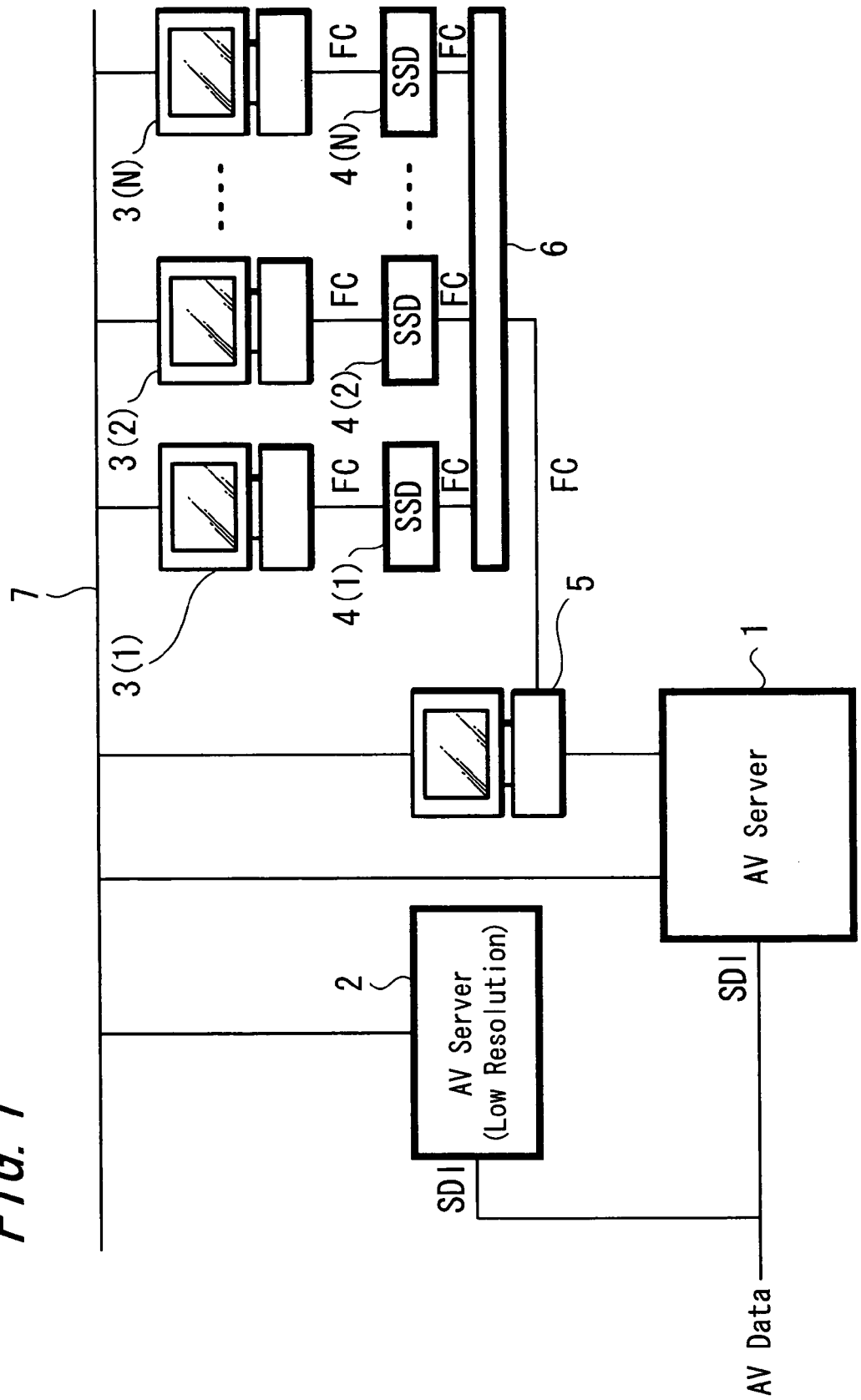
FIG. 1 is a diagram showing the whole configuration of an embodiment of a preview system according to the present invention.

FIG. 1 shows the whole configuration of an embodiment of the preview system according to the present invention. This preview system is, for example, applied to a system of news production in a broadcast station and includes an AV server 1, an AV server 2, a plurality of edit terminals 3 (3(1) to 3(n)), the same numbers of SSDs (Solid State Disk) 4 (4(1) to 4(n)) as the edit terminals, and a gateway terminal 5.

The AV server 1, though not shown in the figure, includes a plurality of SDI ports, RAID, a management system that makes a list of materials (AV data) stored in the RAID to be managed, a network interface that performs communication through an Ethernet, and an interface (bus for the exclusive use called MDR, for example) for transmitting AV data to and receiving AV data from a gateway terminal 5.

Each of the SDI ports of the AV server 1 includes an encoder that compresses AV data input into the AV data of a predetermined compression rate (144 megabit/s, for example). AV data is supplied to the AV server 1 from the outside (from a VTR in the broadcast station, a video camera of on-the-spot coverage connected to the broadcast station by the wide area network or the like). AV data supplied to the AV server 1 is input to any of the SDI ports and the compression processing and so on are performed at the SDI port. Then, the data is sent from the SDI port to the RAID and recorded therein.

The AV server 2, though not shown in the figure, also includes SDI ports, RAID and a network interface that performs communication through an Ethernet.

Each of the SDI ports of the AV server 2 includes an encoder that compresses the input AV data into AV data (of low resolution) that has a higher compression rate (4 to 8 megabit/s, for example) than that of the SDI port of the AV server 1.

The same AV data as supplied to the AV server 1 is supplied to the AV server 2. AV data supplied to the AV server is input each of the SDI ports and the compression processing and so on are performed at the SDI port. Further, the data is sent from that SDI port to the RAID and recorded therein.

The SSD 4 is a storage system in which a solid state memory (SDRAM) is installed and which has a fiber channel port and is capable of higher speed access than a hard-disk drive.

Each of the edit terminals 3(1) to 3(N) and each of the SSDs 4(1) to 4(N) are made to correspond to one by one and are connected by the fiber channel. The gateway terminal 5 is connected to the AV server 1, and also connected to each of the SSDs 4 through a FC (Fiber Channel) switch 6 by the fiber channel.

Further, each of the edit terminals 3, gateway terminal 5, AV server 1 and AV server 2 are connected by Ethernet 7.

The edit terminal 3 is formed of a computer such as a work station.

An editor that is application software for the edit of AV data is installed in the edit terminal 3. The operation screens of the following (1) to (4) are included in the operation screen displayed in this editor.

(1) An operation screen for referring to a material list from the management system inside the AV server via the Ethernet and selecting a material for the edit from the material list.

(2) An operation screen for previewing the material selected in the above-described operation screen (1) and determining a necessary portion of the material for the edit.

(3) An operation screen for previewing the AV data of the portion determined by the above-described operation screen (2) and for editing (determination and modification of IN and OUT points and, pasting the material on the time line, and so on).

(4) An operation screen for recording the edited AV data in the AV server 1.

Also, other than this editor, software performing processing of the followings (a) to (c) is installed in the edit terminal 3.

(a) processing that previews the whole selected material from the AV server 2 via the Ethernet based on the fact that the material for the edit was selected in the above-described operation screen (1)

(b) processing that requests the gateway terminal 5 via the Ethernet to transfer the AV data of the determined portion from the AV server 1 to the corresponding SSD 4 based on the fact that the necessary portion for the edit was determined in the above-described operation screen (2).

(c) processing that previews the AV data from the SSD 4 based on the fact that the operation which previews the AV data was performed in the above-described operation screen (3).

(d) processing that requests the gateway terminal 5 via the Ethernet to record the edited AV data in the AV server 1 based on the fact that the operation which records the edited AV data in the AV server 1 was performed in the above-described operation screen (4).

The gateway terminal 5 is also formed of a computer such as a work station. Software performing processing such as the followings (e) and (f) is installed in the gateway terminal 5.

(e) processing that makes AV data transmitted to the gateway terminal 5 from the AV server 1 and transmits the AV data to the SSD 4 to be recorded therein based on the request by the processing of the above-described (b) from the edit terminal 3.

(f) processing that makes the edited AV data transmitted from the SSD 4, and transmits the edited AV data to the AV server 1 to be recorded therein based on the request from the edit terminal 3 according to the processing of the above-described (d).

In addition, in the above-described processing (e) of the gateway terminal 5, end of data (EOD) that is information showing the end of recorded AV data in a file, is also made to record into a metadata area of the file to which the SSD 4 writes AV data.

Further, in the above-described processing (c) of the edit terminal 3, the SSD 4 previews AV data of the portion before the end indicated by the EOD of the metadata in the file to which the SSD wrote AV data.

Next, operation of an operator and a processing flow based on this operation in this preview system when each of the edit terminals 3 previews AV data stored in the AV server 1 will be explained.

Figure 2:
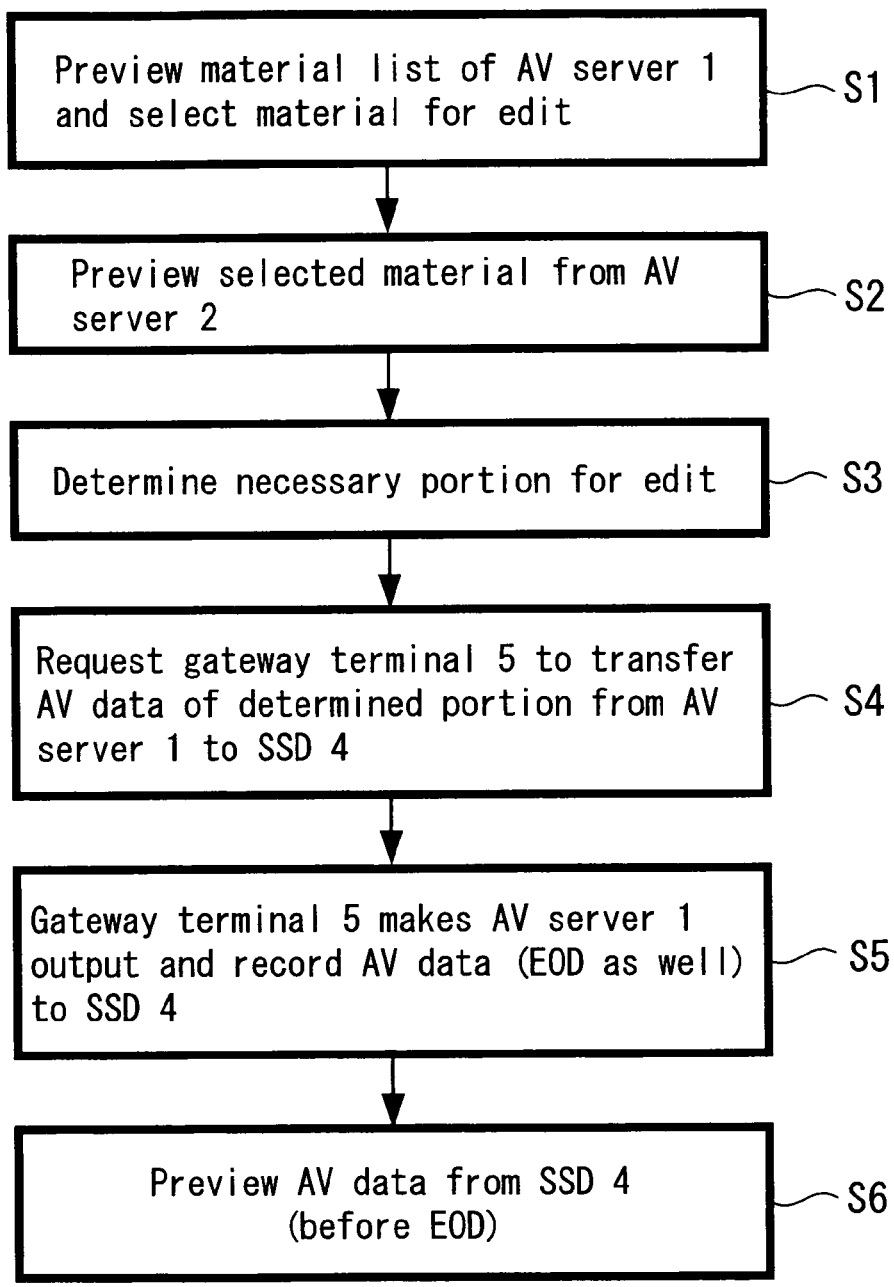
FIG. 2 is a diagram showing a flow of the operation and processing in the system of FIG. 1.

FIG. 2 shows the flow of operation and processing, and at first, an operator of each edit terminal 3 refers to the material list of the AV server 1 on the above-described operation screen (1), and selects from the material list a material for the edit (for example, AV data sent to a broadcast station using a broadband network from a video camera of on-the-spot coverage and stored in the AV server 1) (step S1).

Then, the edit terminal 3 executes the above-described processing (a) and thereby the whole selected material for the edit can be previewed from the AV server 2 via the Ethernet 7 (step 2).

Subsequently, an operator of the edit terminal 3 previews the selected material for the edit on the above-described operation screen (2) and determines the necessary portion thereof for the edit (step S3).

Then, the edit terminal 3 executes the above-described processing (b) and thereby the transfer of the AV data of the determined portion from the AV server 1 to the SSD 4 corresponding to the edit terminal 3 is requested to the gateway terminal 5 via the Ethernet 7 (step S4).

Further, the gateway terminal 5 executes the above-described processing (e) based on this request and thereby the AV data of the determined portion (a portion necessary for the edit) is transmitted from the AV server 1 to the gateway terminal 5 and is recorded in the SSD 4 (the above-described EOD is also recorded in the metadata area of the file to which the SSD writes AV data)(step S5).

Subsequently, when the operator of the edit terminal 3 performs on the above-described operation screen (3) the operation which previews the AV data of the necessary portion for the edit by designating, for example, random frames, the above-described processing (c) is performed by the edit terminal 3 and thereby the AV data of random frames is previewed from the SSD 4 (in this time, AV data of the portion before the end indicated by the EOD of the metadata in the file to which the SSD wrote AV data, is previewed) (step S6).

Figure 3A:
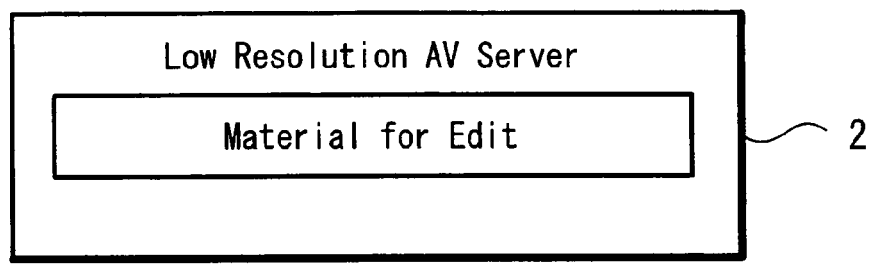
FIGS. 3A to 3C are diagrams showing AV data transferred to an SSD from an AV server in the system of FIG. 1.
Figure 3B:
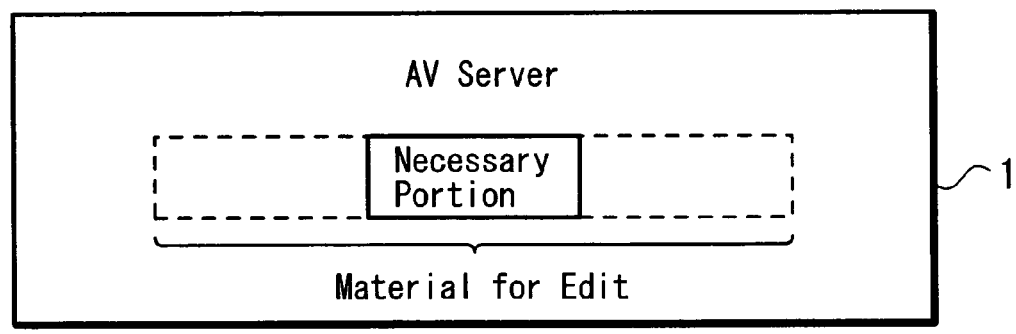
Figure 3C:
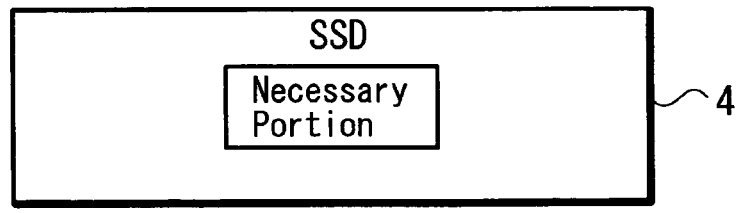

As described above, AV data stored in the AV server 1 is previewed by each of the edit terminals 3. FIGS. 3A to 3C are drawings in which AV data transferred from the AV server 1 to the SSD 4 for the preview is contrasted with the whole material for the edit and is shown. After previewing the whole material for the edit from the AV server 2 of the low resolution as shown in FIG. 3A (step S2 of FIG. 2), a portion necessary for the edit is determined among the whole material for the edit as shown in FIG. 3B (step S3 of FIG. 2). Then, as shown in FIG. 3C, only the necessary portion for the edit in the whole material for the edit is transferred from the AV server 1 to the SSD 4.

When an operator of each edit terminal 3 performs the operation of recording the edited AV data in the AV server 1 in the above-described operation screen (4) after previewing the AV data and performing the edit in the above-described operation screen (3) respectively, the edit terminal 3 executes the above-described processing (d) and, on the basis of that, the gateway terminal 5 executes the above-described processing (f) and thereby the edited AV data is transmitted from the SSD 4 to the AV server 1 through the gateway terminal 5 and is recorded into the AV server 1.

The edited AV data recorded into the AV server 1 in this way is output from one of the SDI ports of the AV server 1 and is sent from the AV server 1 to the outside (a server for broadcasting, a server for backup, and so on).

As described above, in this preview system, the same AV data stored in the AV server 1 is also stored in the AV server 2 that compresses AV data with a higher compressibility than that of the AV server 1. Further, the SSD 4 capable of performing higher speed access than the RAID inside the AV server 1 is connected to a plurality of edit terminals 3.

Then, after previewing the whole material for the edit from the AV server 2, based on the determination of a necessary portion for the edit from among the material, each edit terminal 3 makes a request to transfer AV data of the determined portion from the AV server 1 to the SSD 4, and previews AV data of the necessary portion for the edit from the SSD 4.

Therefore, each edit terminal 3 can preview the AV data stored in the AV server 1 from the SSD 4. Accordingly, differently from the case in which the SDI port of the AV server 1 and the edit terminal are made to correspond to one by one and are connected, the material stored in the AV server 1 can be previewed by a plurality of edit terminals 3 simultaneously in parallel without being restricted to the number of the SDI ports of the AV server 1.

Further, because the whole material for the edit (material for determining the necessary portion for the edit) is previewed from the AV server 2 that has the higher compressibility (low resolution) than the AV server 1, waiting time becomes shorter than the case of previewing from the AV server 1 directly.

Further, because only the AV data of necessary portion for the edit determined from among the previewed whole material is transferred to the SSD 4 from the AV server 1, the time needed to transfer becomes short differently from the case of transferring the whole material for the edit from the AV server 1 to the SSD 4.

Furthermore, because the SSD 4 is capable of performing higher speed access than the RAID of the AV server 1, the waiting time for previewing AV data of random frames from the SSD 4 in the editing time by the edit terminal 3 becomes shorter than the case of directly previewing the AV data of random frames from the AV server 1.

Accordingly, the waiting time when the material stored in the AV server 1 is previewed by the edit terminal 3 becomes short.

Further, a solid state memory is used for the SSD and is generally expensive in comparison with RAID, however, a memory of the minimum capacity for storing only AV data of the necessary portion for the edit is needed and used for the SSD 4, therefore, the cost increase due to providing the SSD can be restrained to the minimum.

Further, because the transmission and reception of AV data among the gateway terminal 5, the SSD 4 and the edit terminal 3 are performed using a fiber channel, AV data stored in the AV server 1 can be previewed by a larger numbers of edit terminals 3 simultaneously in parallel by providing the network connection taking advantages of characteristics of the fiber channel.

Furthermore, by the gateway terminal 5, the end of data (EOD) that is information showing the end of the written portion of AV data in a file is recorded into a metadata area of the file to which the SSD 4 writes AV data, and each of the edit terminals 3 previews AV data of the portion before the end indicated by the EOD of the metadata in that file and thereby in the case where AV data is previewed from the SSD 4 by the edit terminal 3 while the SSD is writing AV data in the file, such a situation of previewing a portion to which AV data has not been written yet in that file (skip reading) can be prevented.

Further, in the above-mentioned embodiment, AV data stored in the AV server that includes the SDI port is the object for the preview. However, not limited thereto, AV data stored in an AV server that includes an input and output port other than the SDI port may be the object for the preview according to the present invention.

Furthermore, in the above embodiment, the SSD 4 is provided between the AV server 1 and the edit terminal 3. However, as another embodiment, other recording apparatuses than the SSD, which is capable of performing higher speed access than the RAID in the AV server 1 may be provided between the AV server 1 and the edit terminal 3.

Moreover, in the above embodiment, the present invention is applied to the news production system. However, not limited thereto, the present invention may be applied to any appropriate system (for example, a program production system other than news, CM production, movie production and so on) which needs to preview AV data stored in an AV server by an edit terminal.

Another Embodiment of the Preview System According to the Present Invention

Figure 4:
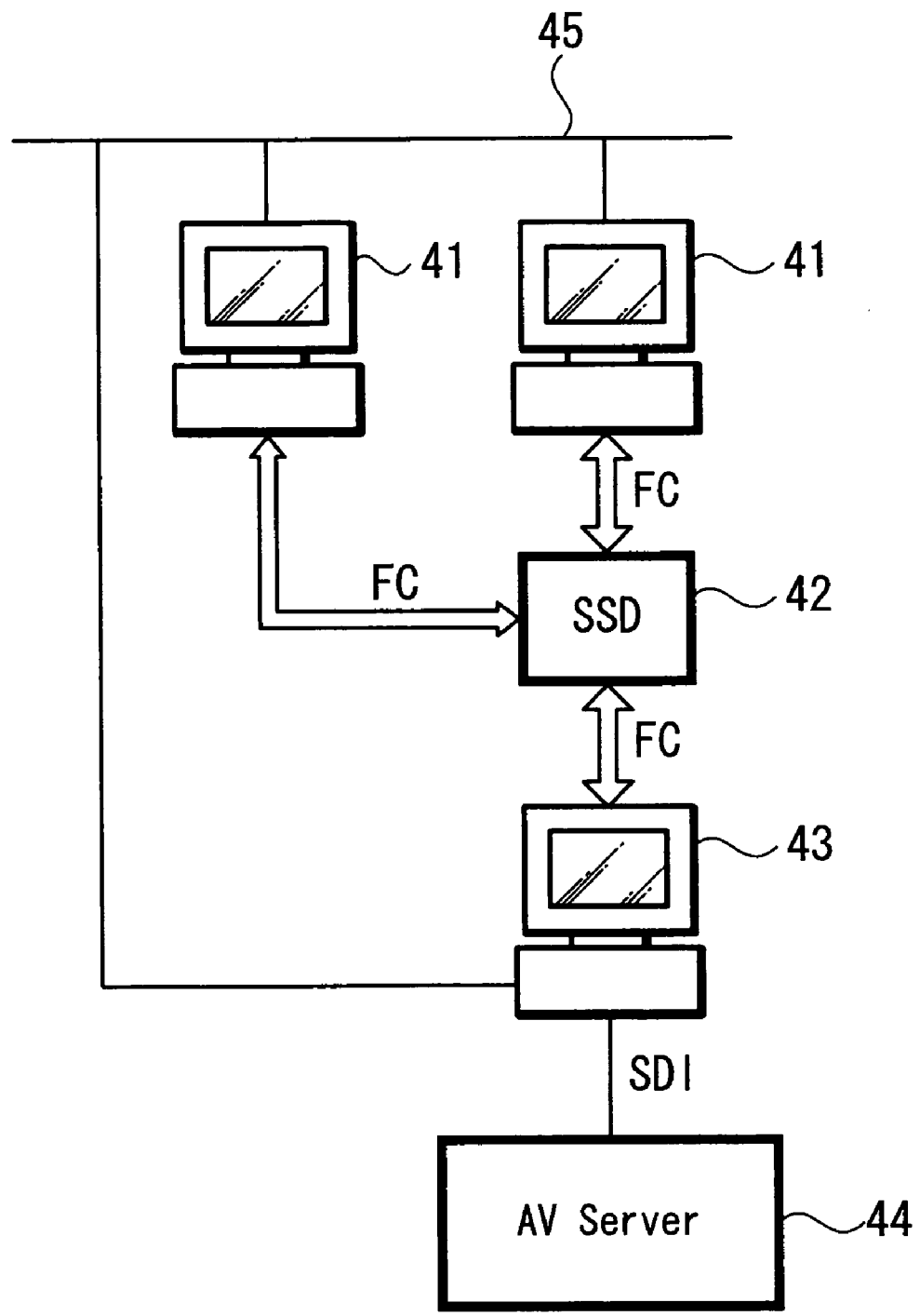
FIG. 4 is a diagram showing the whole configuration of another embodiment of the preview system according to the present invention.

FIG. 4 shows the whole configuration of another embodiment of the preview system according to the present invention. This preview system is applied to a news production system of a broadcast station for example, and includes two edit terminals 41, a solid state disk (SSD) 42, a gateway terminal 43 and an AV server 44.

The SSD 42 is a storage system in which a solid state memory (SDRAM) is installed and which has four fiber channel ports and is capable of higher speed access than a hard-disk drive.

Although not shown in the figure, an SDI input and output port, RAID, and a controller that controls the whole of the AV server are connected through a bus in the AV server 44.

Each of the edit terminals 41 and the SSD 42 are connected by the fiber channel. The gateway terminal 43 is connected to the controller and the SDI input and output port inside the AV server 44 and is connected to the SSD 42 by the fiber channel.

Further, each of the edit terminals 41 and the gateway terminal 43 are connected by means of Ethernet 45. The edit terminal 41 and the gateway terminal 43 are formed of a computer such as a work station, respectively.

Figure 5:
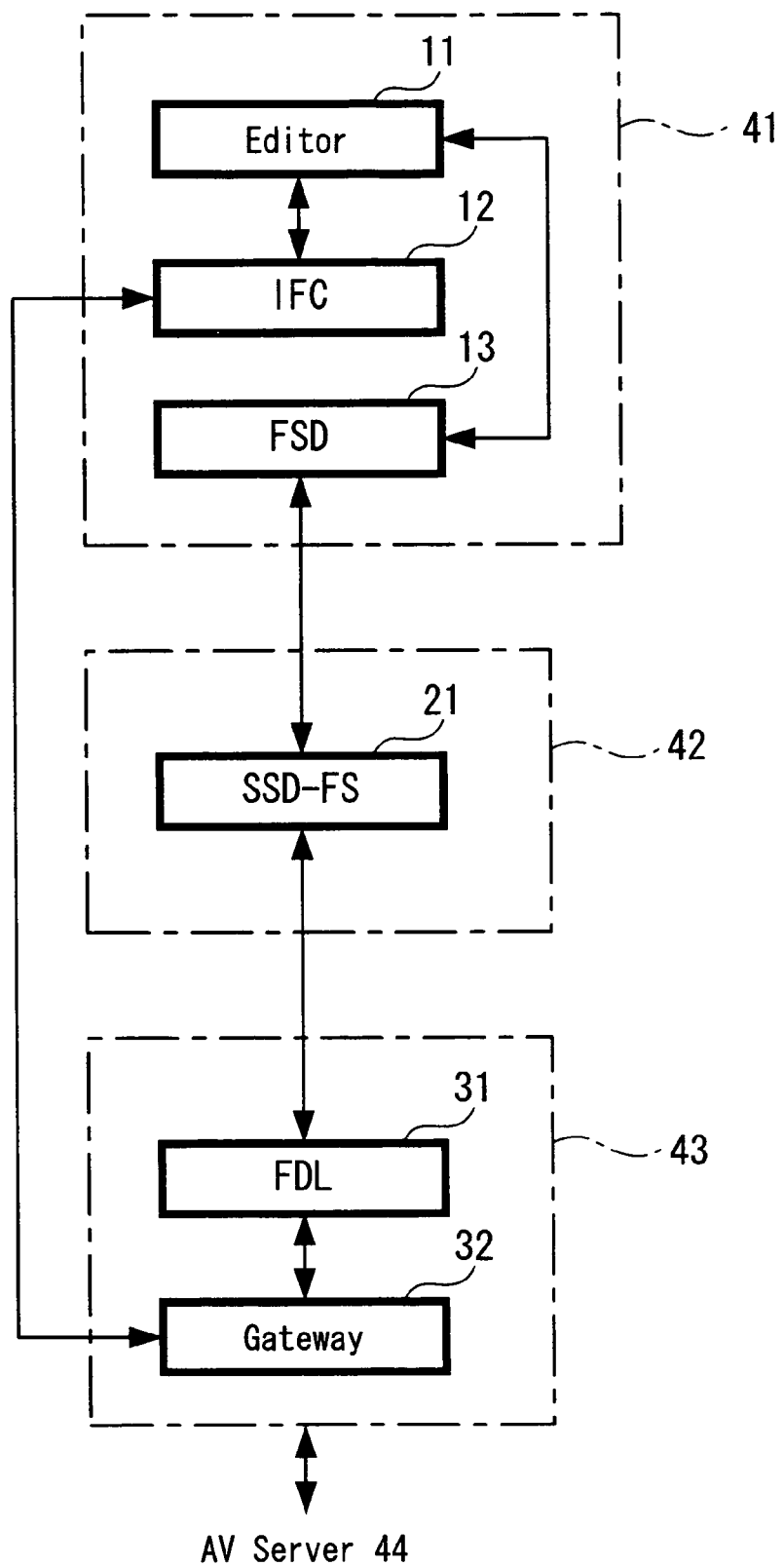
FIG. 5 is a diagram showing software in an edit terminal and a gateway terminal of FIGS. 4A to 4C.

FIG. 5 shows software installed in the edit terminal 41 and gateway terminal 43. Other than an editor 11 that is application software for edit, an IFC 12 that is processing software which requests the gateway terminal 43 via the Ethernet to transfer AV data from the SDI input and output port of the AV server 44 to the SSD 42, and an FSD 13 that is processing software which reads AV data recorded in the SSD 42 into the edit terminal 41 (for that, to control the SSD 42 by communicating with an SSD-FC 21 that is system software of the SSD 42) are installed in the edit terminal 41.

A gateway 32 that is software which makes AV data transmitted from the AV server 44 based on the request from the IFC 12 inside the edit terminal 41 and performs format conversion of the AV data for the transmission by the fiber channel, and an FDL 31 that is processing software by which the AV data format-converted by the gateway 32 is made to record into the SSD 42 (for that, to control the SSD 42 by communicating with the SSD-FC 21 that is system software of the SSD 42) are installed in the gateway terminal 43.

Figure 6:
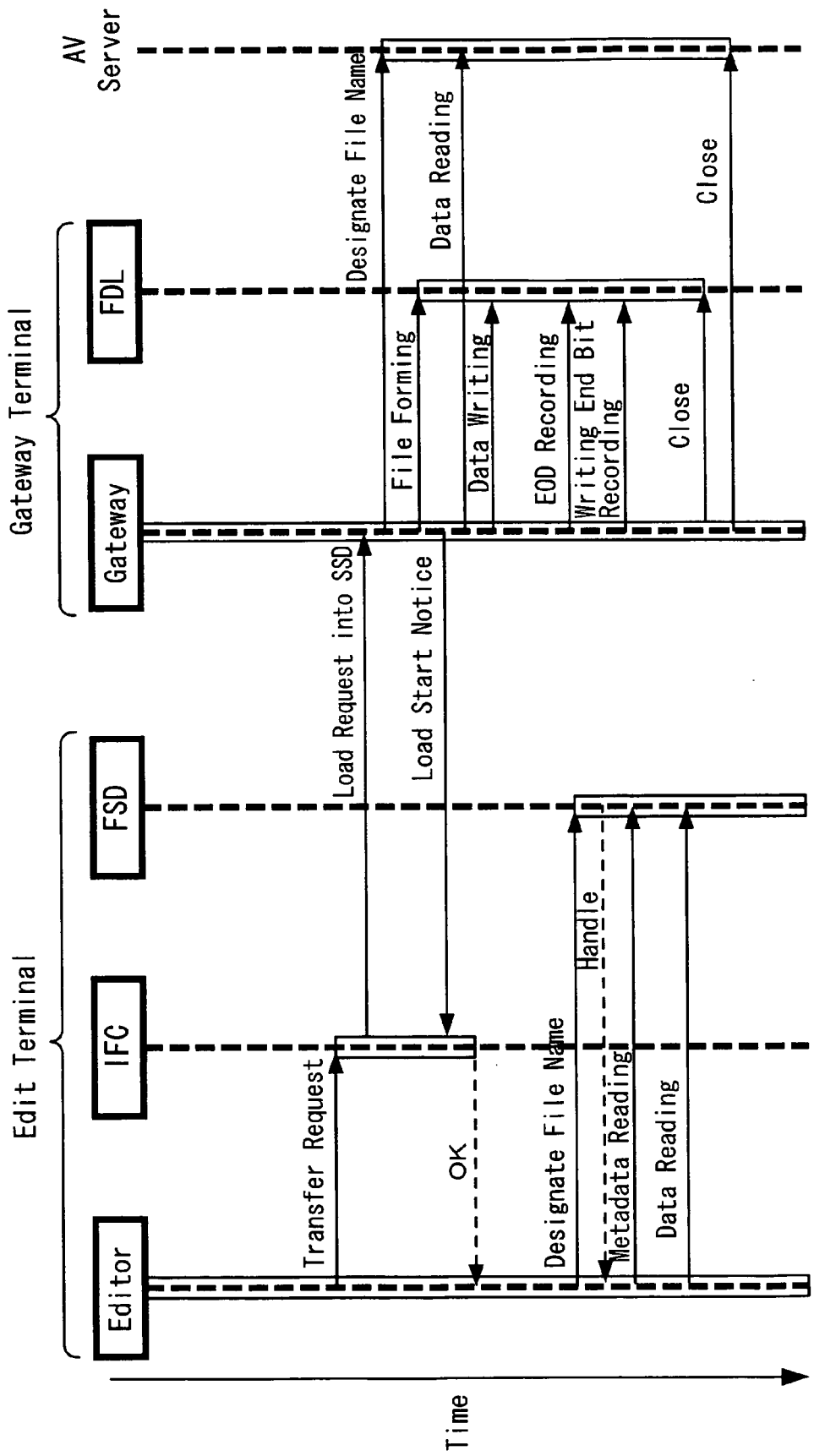
FIG. 6 is a diagram showing a sequence by the software of FIG. 5, when each of the edit terminals of FIG. 4 reads the material from the AV server.

FIG. 6 shows the sequence of processing by the editor 11, IFC 12, FSD 13, gateway 32 and FDL 31, when each of the edit terminals 41 reads a material (AV data) from the AV server 44.

When an operation that transfers a certain file stored in the AV server 44 to the SSD 42 is performed by the editor 11 in the operation screen, the editor 11 in the edit terminal 41 sends the IFC 12 in the same edit terminal 41 a transfer request to the SSD 42.

Upon receiving the transfer request, the IFC 12 sends a load request of the file into SSD 42 to the gateway 32 in the gateway terminal 43 via the Ethernet 45 (FIG. 4).

Based on the load request, the gateway 32 requests the controller in the AV server 44 to designate the file name and to output AD data inside the file from the SDI input and output port connected to the gateway terminal 43. Further, the gateway 32 makes the SSD 42 form a file to record the AV data through the FDL 31 in the gateway terminal 43. Then, the gateway 32 notifies through the Ethernet 45 the IFC 12 in the edit terminal 41 that has sent the load request of the fact that the load was started and a name of the file formed in the SSD 42.

Subsequently, when the AV data is sent from the SDI input and output port of the AV server 44 to the gateway terminal 43, the gateway 32 sends the AV data, after making the data into the transmission format for the fiber channel, to the SSD 42 through the FDL 31 to be recorded in the file formed in the SSD 42. Further, through the FDL 31, the gateway 32 makes the end of data (EOD) that is information showing the end of the recorded AV data portion in the file recorded into the area for recording metadata of the file.

Subsequently, after making all the AV data from the AV server 44 written into the file in the SSD 42, the gateway 32 makes a writing end bit recorded in the area for the recording the metadata of the file through the FDL 31. Then, the gateway 32 makes the SSD 42 close the file through the FDL 31 and also makes the controller in the AV server close the file.

Upon being notified from the gateway 32 in the gateway terminal 43 of the fact that the load was started and the name of the file formed in the SSD 42, the IFC 12 in the edit terminal 41 notifies the editor 11 in the edit terminal 41 of the fact that the transfer request to the SSD 42 is received (OK) and the name of the file formed in the SSD 42.

When the operation that reads the AV data transferred to the SSD 42 into the edit terminal 41 is performed on the operation screen in editor 11 after the editor 11 in the edit terminal 41 receiving this notice from the IFC 12, the editor 11 designates the name of the file notified from the IFC 12 to the SSD 42 through the FSD 13 in the same edit terminal 41.

Upon the designation of the name of this file, the SSD 42 returns the handle value of the file (the characteristic value to the file in the system) to the editor 11 through the FSD 13 in the edit terminal 41.

When receiving the handle value, the editor 11 reads the AV data of the portion before the end indicated by the EOD in the metadata of that file into the edit terminal 41 from the SSD 42, while reading through the FSD 13 the metadata of the file from the SSD 42 as needed. Further, when the writing end bit is included in the metadata, the fact that all the AV data has been written in that file can be recognized.

Figure 7:
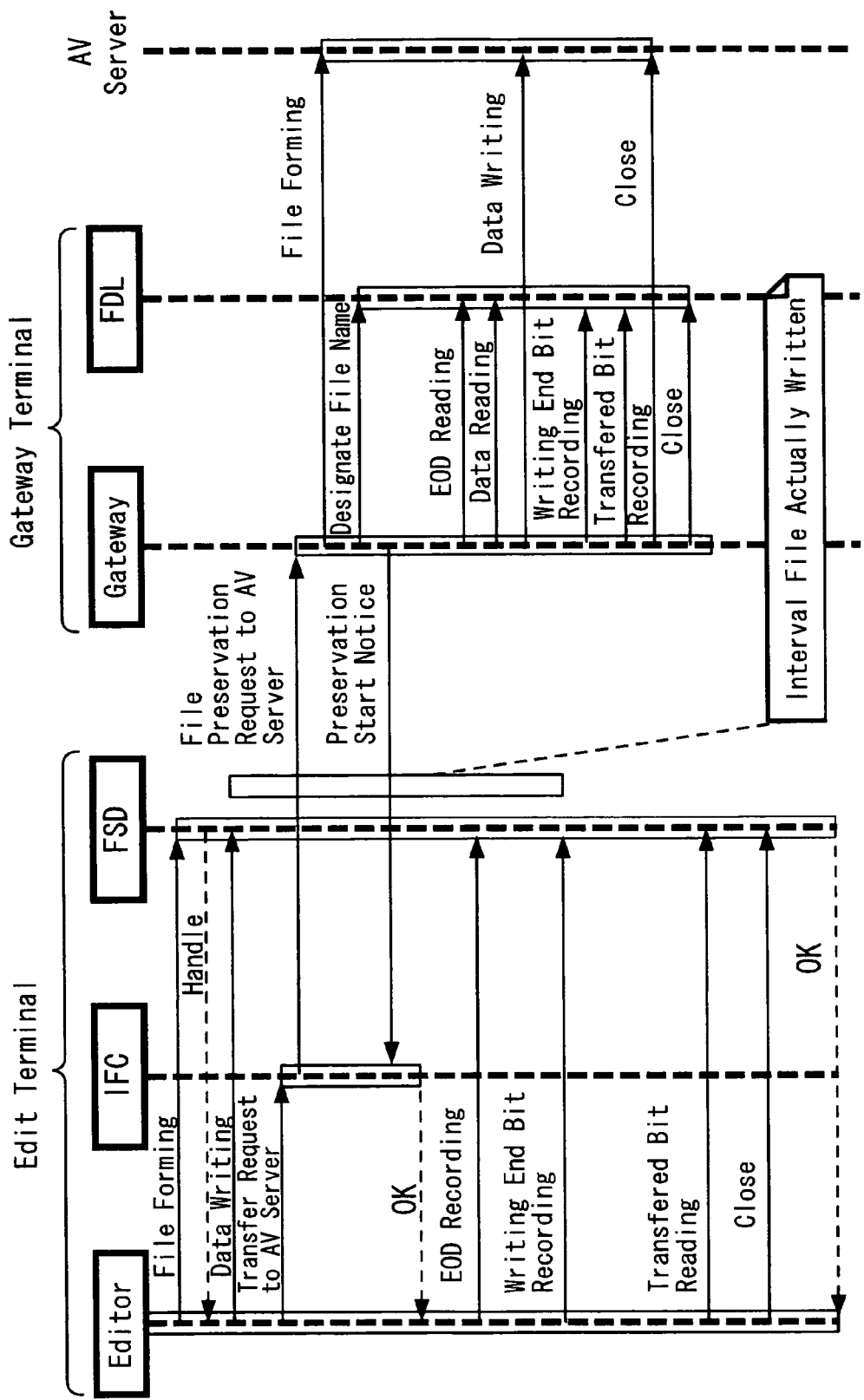
FIG. 7 is a diagram showing a sequence by the software of FIG. 5, when each of the edit terminals of FIG. 4 writes the edited result into the AV server.

FIG. 7 shows the sequences of processing by the editor 11, IFC 12, FSD 13, gateway 32 and FDL 31 of FIG. 5, when the edit result (the edited AV data) in the edit terminal is written in the AV server 44.

When the operation of writing the edited AV data into the AV server 44 is performed on an operation screen after the AV data read into the edit terminal 41 in the sequence of FIG. 6 is edited on the operation screen by the editor 11, the editor 11 in the edit terminal 41 makes the file to record the edited AV data formed in the SSD 42 through the FSD 13 in the same edit terminal 41.

The SSD 42 returns the handle value of the formed file (the characteristic value of the file in the system) to the editor 11 through the FSD 13 in the edit terminal 41.

When receiving the handle value, the editor 11 makes through the FSD 13 the SSD 42 start writing the edited AV data into the file formed. Then, the editor 11 sends the transfer request to the AV server 44 of the AV data of the file inside the SSD 42, to the IFC 12 in the same edit terminal 41.

When receiving this transfer request, the IFC 12 sends a preservation request to the AV server 44 of the file formed in the SSD 42, to the gateway 32 in the gateway terminal 43, via the Ethernet 45 (FIG. 4).

Based on this preservation request, the gateway 32 in the gateway terminal 43 makes the controller in the AV server 44 form the file to record the edited AV data. Further, the gateway 32 designates through the FDL 31 of the gateway terminal 43 the file formed to record the edited AV data for the SSD 42. Then, the gateway 32 notifies via the Ethernet 45 the IFC 12 in the edit terminal 41, which has sent the preservation request, of the fact that the preservation has been started and the name of the file formed in the AV server 44.

Upon notification from the gateway 32 in the gateway terminal 43 of the fact that the preservation has been started and the name of the file formed in the AV server 44, the IFC 12 in the edit terminal 41 notifies the editor 11 in the edit terminal 41 of the fact that the preservation request was received (OK) and the name of the file formed in the AV server 44.

Through the FSD 13, the editor 11 in the edit terminal 41 makes the SSD 42 record the end of data (EOD) that is information showing the end of the recorded portion of AV data in the file into the area for recording the metadata of the file, while making the SSD 42 write the edited AV data into the file. Then, after all the AV data edited were written, the writing end bit that indicates the completion of writing of all the AV data is recorded into the area for recording the metadata of the file. (the time interval in which the data is actually written into the file of the SSD 42 is from the time when starting the writing the above-described edited AV data until the time when recording the writing end bit.)

After notifying the fact that the preservation was started in the IFC 12 of the edit terminal 41 and the name of the file formed in the AV server 44, the gateway 32 in the gateway terminal 43 reads the AV data of the portion before the end indicated by the EOD in the metadata of the file from the SSD 42, while reading through the FDL 31 as needed the metadata of that file formed in the SSD 42. Then, after making the read AV data into the format for the transmission in the SDI, the data is input to the SDI input and output port of the AV server 44 and is recorded into the file formed in the AV server 44.

Further, after reading the writing end bit as the metadata of the file formed in the SSD 42, the gateway 32 records the transferred bit into the metadata area of that file. Then, the gateway 32 makes the controller of the AV server 44 close the file formed and also makes the SSD 42 close the file through the FDL 31.

After recording the writing end bit into the area for recording the metadata of the file formed in the SSD 42, the editor 11 in the edit terminal 41 reads the writing end bit from the area of the metadata of that file and then makes through the FSD 13 the SSD 42 close the file. After closing the file, the SSD 42 notifies the editor 11 through the FSD 13 of the fact that the file was closed (OK).

Next, in this news production system, the sequence of editing the material stored in the AV server 44 by each edit terminal will be explained.

When an operator of each of the edit terminals 41 performs operation of transferring the files respectively stored in the AV server 44 (for example, AV data sent from a video camera of on-the-spot coverage to a broadcast station through a wide area network and stored in an AV server) to the SSD 42 on the operation screen in the editor 11, AV data in the file is output from the common SDI input and output port of the AV server 44 and is transferred and recorded into the SSD 42 by means of the editor 11 and IFC 12 in the edit terminal 41, and the gateway 32 and FDL 31 in the gateway terminal 43 (FIG. 6).

Subsequently, when those operators execute the operation in which the AV data transferred to the SSD 42 is read into the edit terminal 41 respectively on the operation screen in the editor 11, the AV data transferred and recorded in the SSD 42 is read into the edit terminal 41 by means of the editor 11, IFC 12 and FSD 13 in the edit terminal 41 (FIG. 6).

After those operators perform the operation to edit the read-in AV data (edit for cut, paste on the time line and so on) on the operation screen in the editor 11, and the operation of writing the edited AV data into the AV server 44 is performed; by means of the editor 11, IFC 12, FSD 13 in the edit terminal 41, gateway 32 and FDL 31 in the gateway terminal 43, the edited AV data is transferred from that edit terminal 41 and is recorded in the SSD 42, and after that, the AV data is input to the common SDI input and output port of the AV server 44 from the SSD 42 and is recorded into the AV server 44 (FIG. 7).

As described above, in this news production system, after each of the two edit terminals 41 connected to the SSD 42 capable of performing higher speed access than the RAID in the AV server 44 makes a request to transfer AV data to the SSD from the common SDI input and output port of the AV server 44 respectively by the editor 11 and IFC 12, the AV data stored in the SSD 42 is read by the editor 11 and FSD 13 and thereby the AV data is read into the edit terminal 41 from the AV server 44.

Accordingly, since the AV server 44 transfers AV data from one SDI port to the SSD 42, two edit terminals 41 can read the AV data from the AV server 44 through the SSD 42, simultaneously in parallel. As a result, a larger number of edit terminals than that of the SDI input and output ports of the AV server 44 (that is, two terminals per SDI input and output port) are capable of reading AV data (namely, previewing AV data stored in the AV server) from the AV server 44 simultaneously in parallel.

Further, in the AV server that has a TCP/IP protocol network interface and in the case where a method in which AV data is transferred from the network interface by a file transfer protocol (FTP), because the file transfer protocol has a characteristic that AV data in a file can be reproduced only after completing the file, the AV data can not simultaneously be reproduced (by the follow-up reproduction) from the AV server and transferred, while storing AV data from the outside into the AV server.

In a news program, a material to be stored in the AV server is often required to be edited within the limited time until the scheduled broadcasting. It is greatly inconvenient if the follow-up reproduction can not be performed, in that case.

On the contrary, because AV data is output from the SDI input and output port (is not transmitted from the network interface by the file transfer protocol), AV data can be read in the edit terminal 41 from the AV server 44 by performing the follow-up reproduction.

Further, because the SSD 42 is capable of performing higher speed access than the RAID in the AV server 44, waiting time when the edit terminal 2 (editor 11 and FSD 13) reads AV data of random frames from the SSD 42 becomes shorter than the waiting time when reading AV data of random frames from the AV server 44.

Furthermore, the gateway terminal 43 (gateway 32) makes the end of data (EOD) that is information showing the end of the recorded portion of AV data in the file recorded into the metadata area of the file where the SSD 42 records AV data, and each edit terminal 41 (editor 11) reads the AV data from the file based on this EOD, so that also in the case where the edit terminal 41 reads the AV data from the SSD 42 while the SSD 42 is recording the AV data in the file, such a situation can be prevented in which a portion where AV data has not been recorded in that file is read by the edit terminal 41.

Figure 8A:
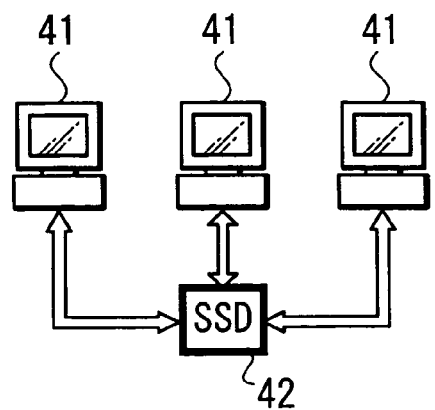
FIGS. 8A to 8C are diagrams showing modified examples of the connection between the edit terminal, SSD and gateway terminal in the system of FIG. 4.
Figure 8B:
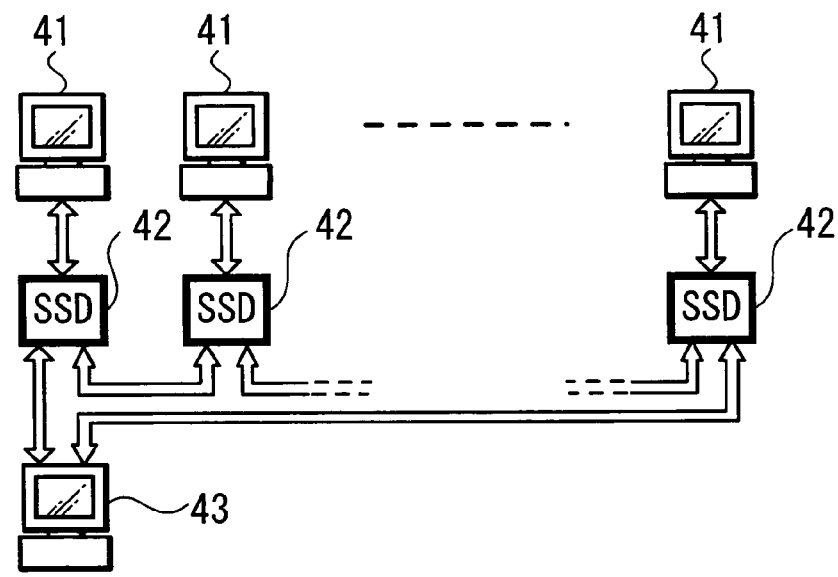
Figure 8C:
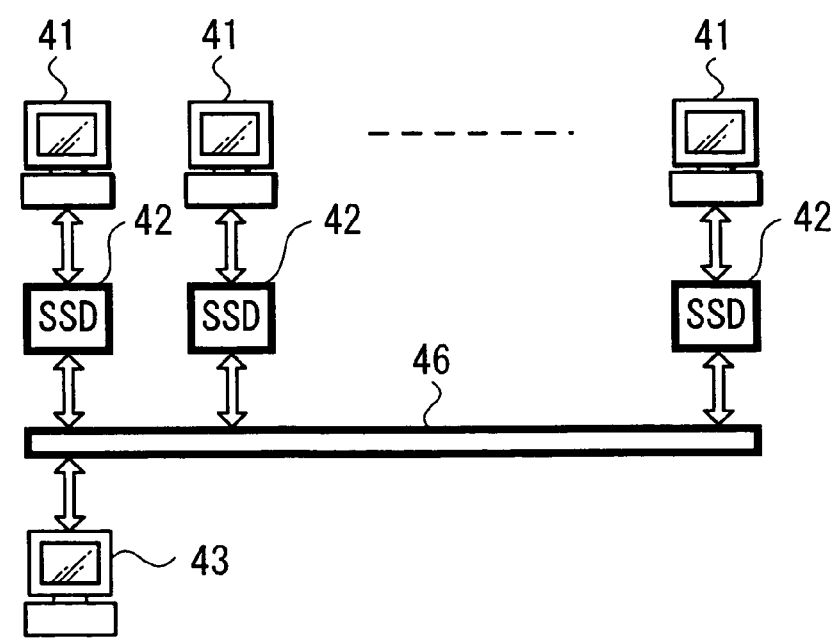

At last, FIGS. 8A to 8C show modified examples of the connection among the edit terminal 41, SSD 42 and gateway terminal 43 in this news production system.

Among these, in the example of FIG. 8A, three edit terminals 41 are connected to the SSD 42 using all of four fiber channel ports that the SSD 42 has. In this example, three edit terminals 41 per SDI input and output port of the AV server 44 can read AV data from the AV server 44, simultaneously in parallel.

In the example of FIG. 8B, a plurality of edit terminals 41 and SSD 42 are made to correspond to one by one and are connected, and each SSD 42 is connected to the gateway terminal 43 with the cascade connection. In this example, the plurality of edit terminals 41 per SDI input and output port of the AV server 44 can read AV data from the AV server 44, simultaneously in parallel.

In the example of FIG. 8C, a plurality of edit terminals 41 and SSD 42 are made to correspond to one by one and are connected, and each SSD 42 is connected to the gateway terminal 43 through the FC (Fiber Channel) switch 46. In this example, the plurality of edit terminals 41 per SDI input and output port of the AV server 44 can also read AV data from the AV server 44, simultaneously in parallel.

In this way, in this news production system, because the transmission and reception among the gateway terminal 43, SSD 42 and edit terminal 41 is performed using the fiber channel, a further large number of edit terminals 41 per SDI input and output port of the AV server 44 can read AV data from the AV server 44, simultaneously in parallel by performing the network connection taking advantages of the characteristic of the fiber channel as shown each of the examples in FIG. 8A to 8C.

Note that, in the above-described embodiments, the AV server that includes the SDI port is the object from which AV data is read according to the present invention. However, not limited thereto, an AV server that includes a synchronous input and output port other than the SDI may be the object from which AV data is read according to the present invention.

Further, in the above embodiments, the present invention is applied to the news production system. However, not limited thereto, the present invention may be applied to any appropriate system (for example, a TV program production system except news, CM production, movie production and so on) which needs to preview AV data stored in the AV server with the edit terminal.

An Embodiment Using the SSD Including a Sparse Function

Next, a further specific example of the SSD (and processing of an edit terminal corresponding thereto) suitable for use in a system of the respective embodiments is explained.

In this embodiment, a storage system in which a solid state memory (SDRAM) of the capacity of 64 gigabyte as a recording medium is installed as the SSD (SSDs 4(1) to 4(N) in the system of FIG. 1, SSD 42 in the system of FIG. 4) and a file system corresponding to an NTFS 5 file system (file system supported by Windows® XP and Windows® 2000).

A sparse function can be used in the NTFS 5 file system and also in the file system installed in the SSD. A sparse file made by this function consumes only the capacity of blocks actually used (a portion where actual data exists) among all the files.

Figure 10:
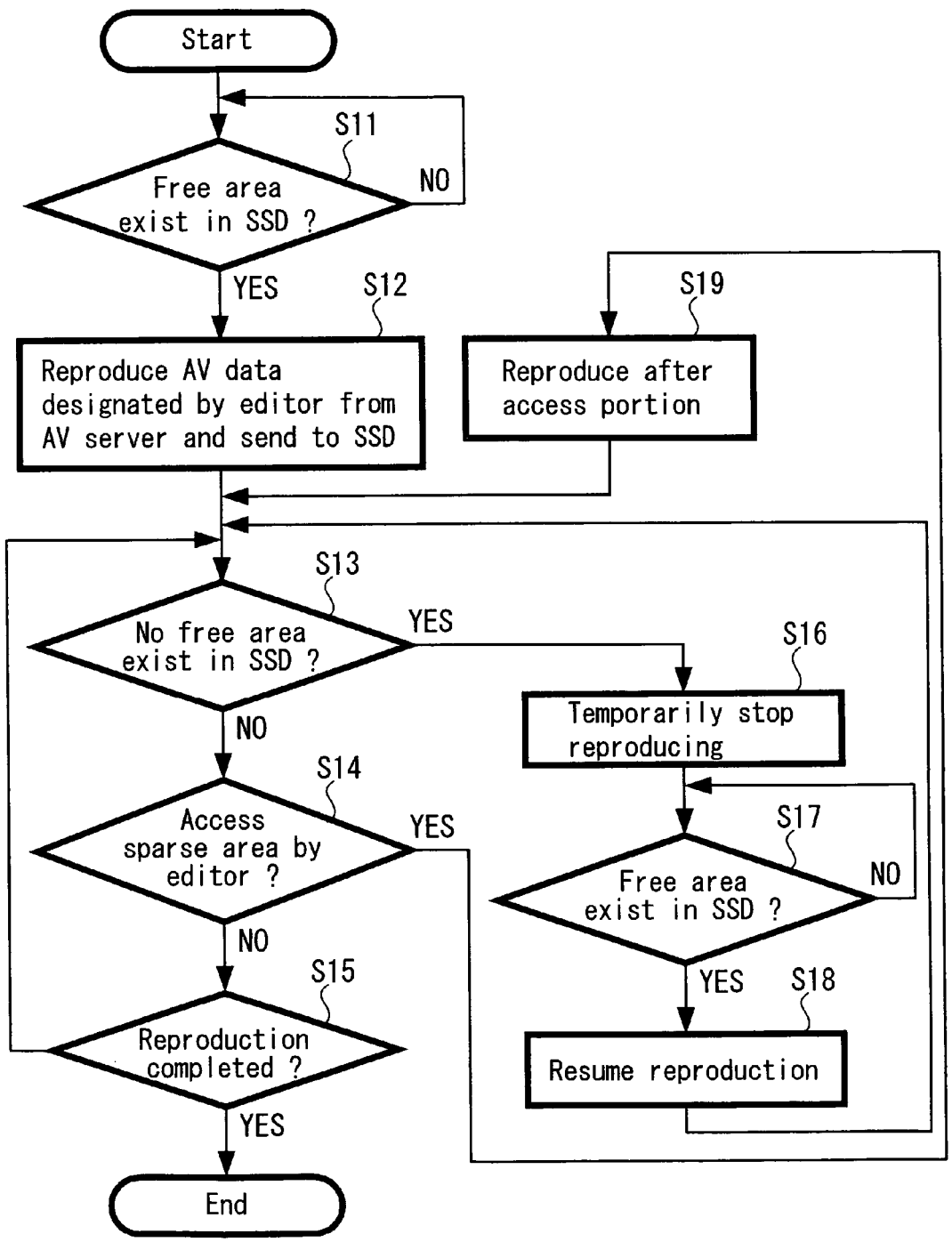
FIG. 10 is a flow chart showing the processing by the material management software in the edit terminal of FIG. 1 or FIG. 4.
Figure 11:
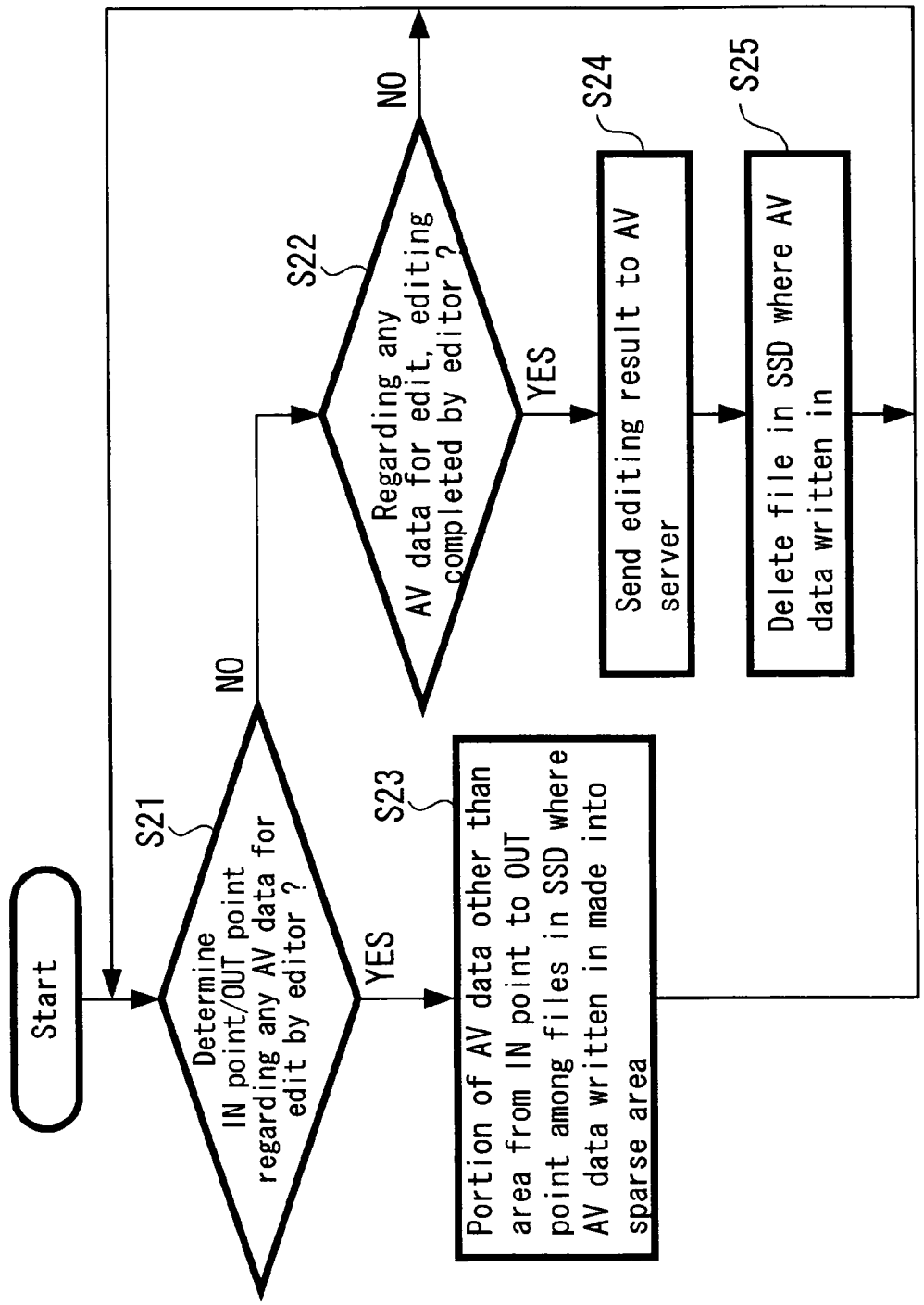
FIG. 11 is a flow chart showing the processing by the material management software in the edit terminal of FIG. 1 or FIG. 4.

Further, in this embodiment, material management software as shown in FIGS. 9 to 11 is installed in the edit terminal (edit terminals 3(1) to 3(N) in the system of FIG. 1, edit terminals 41 in the system of FIG. 4).

Among these, in the processing of FIG. 9, the SSD is controlled via the fiber channel based on the fact that AV data for the edit was designated by the edit terminal and the fact that AV data was accessed on the time line while editing in the edit terminal.

The processing starts each time when AV data for the edit is newly designated by the edit terminal, and at first, an empty file is formed by the SSD and a sparse area that is the same amount as that of the designated AV data for the edit is formed in the file (step S1).

Next, whether or not at present a free area exists in the SSD is judged (step S2).

When it is "NO", the step S2 is repeated, and when "YES" is obtained, the designated AV data for the edit transmitted from the AV server (AV server 1 in the system of FIG. 1, AV server 44 in the system of FIG. 4) via the gateway terminal (gateway terminal 5 in the system of FIG. 1, gateway terminal 43 in the system of FIG. 4) is recorded in the file of the SSD from the head portion (step S3).

Subsequently, the judgment of whether or not no free area exists in the SSD (step S4), the judgment of whether or not a frame that becomes a sparse area of this file in the SSD (a frame where AV data has not been recorded in the SSD yet) was accessed (step S5), and the judgment of whether or not the writing of AV data to the end of this file in the SSD was completed (step S6), are repeated until "YES" is obtained at one of these steps.

When "YES" is obtained at step S4, the writing AV data into this file of the SSD is stopped temporarily (step S7). Further, the judgment of whether the free area again exists in the SSD (step S8) is repeated until "YES" is obtained, and when "YES" is obtained, the writing AV data into this file in the SSD is resumed (step S9) and the processing returns to step S4.

When "YES" is obtained at step S5, the writing position of AV data to this file in the SSD is made to change into the portion of a sparse area that becomes a frame accessed on a time line (step S10). Then, the processing returns to step S4. Also, when "YES" is obtained at step S6, the processing is ended.

The processing of FIG. 10 is processing that controls the AV server (the control of the AV server is performed through the control gateway terminal in the system of FIGS. 1 and 4), based on the fact that AV data for the edit was designated by the edit terminal and the fact that AV data was accessed on the time line while editing in the edit terminal.

Similarly to the processing of FIG. 9, the processing starts each time when AV data for the edit is newly designated by the edit terminal, and at first, whether or not at present the free area exists in the SSD is judged (step S11). When it is "NO", the step 11 is repeated and when "YES" is obtained, through the gateway terminal the AV server is made to reproduce the designated AV data for the edit from the RAID to be transmitted to the SSD (step S12).

Subsequently, the judgment of whether or not no free area exists in the SSD (step S13), the judgment of whether or not a frame where AV data has not been reproduced from the AV server (namely, a frame that becomes a sparse area of the file in the SSD where AV data for the edit has been written in the processing of FIG. 9) was accessed on the time line (step S14), and the judgment of whether or not the reproduction of the AV data for the edit to the end was completed (step S15), are repeated until "YES" is obtained at one of these steps.

When "YES" is obtained at step S13, reproducing AV data in the AV server is temporarily stopped (step S16). Further, the judgment of whether the free area again exists (step S17) is repeated until "YES" is obtained, and when "YES" is obtained, the reproducing AV data (step S18) is resumed and the processing returns to step S13.

When "YES" is obtained at step S14, the AV server is made to reproduce AV data subsequent to the frame that was accessed on the time line (step S19). Then, the processing returns to step S13. Further, when "YES" is obtained at step S15, the processing is ended.

The processing of FIG. 11 is processing that controls the SSD and the AV server via the fiber channel, based on the fact that a necessary area for the edit among AV data for the edit was determined by the IN and OUT points on the time line, while editing by the edit terminal and the fact that the operation of registering the editing result by the edit terminal into the AV server was executed when the editing ended.

In this processing, with respect to a piece of or plural kinds of AV data for the edit that have already been designated by the edit terminal, the judgment of whether or not a necessary area for the edit among the AV data for the edit was determined by the IN and OUT points on the time line (step S21), and the judgment of whether or not the operation of registering the editing result by the edit terminal into the AV server was executed (step S22), are repeated until "YES" is obtained at one of these steps.

When "YES" is obtained at step S21, the SSD is controlled and a portion where AV data other than the area from the IN point to the OUT point was written in (namely, unnecessary AV data for the edit), among the file where the AV data was written in, is changed to the sparse area (step S23). Then, the processing returns to step S21.

When "YES" is obtained at step S22, the editing result is transmitted to the AV server and is stored (step S24). Then, the SSD is controlled to erase the file in which the AV data was written in (step S25). Then, the processing returns to step S21.

Next, in the system that uses such SSD, the sequence of editing AV data stored in the AV server by the edit terminal is explained.

In the case of editing various kinds of AV data (for example, AV data sent from a number of video cameras of on-the-spot coverage and stored in an AV server) stored in the AV server one by one, at first, an operator which operates the edit terminal designates in the edit terminal the whole of those various kinds of AV data as the AV data for the edit from a list of AV data displayed.

Figure 12:
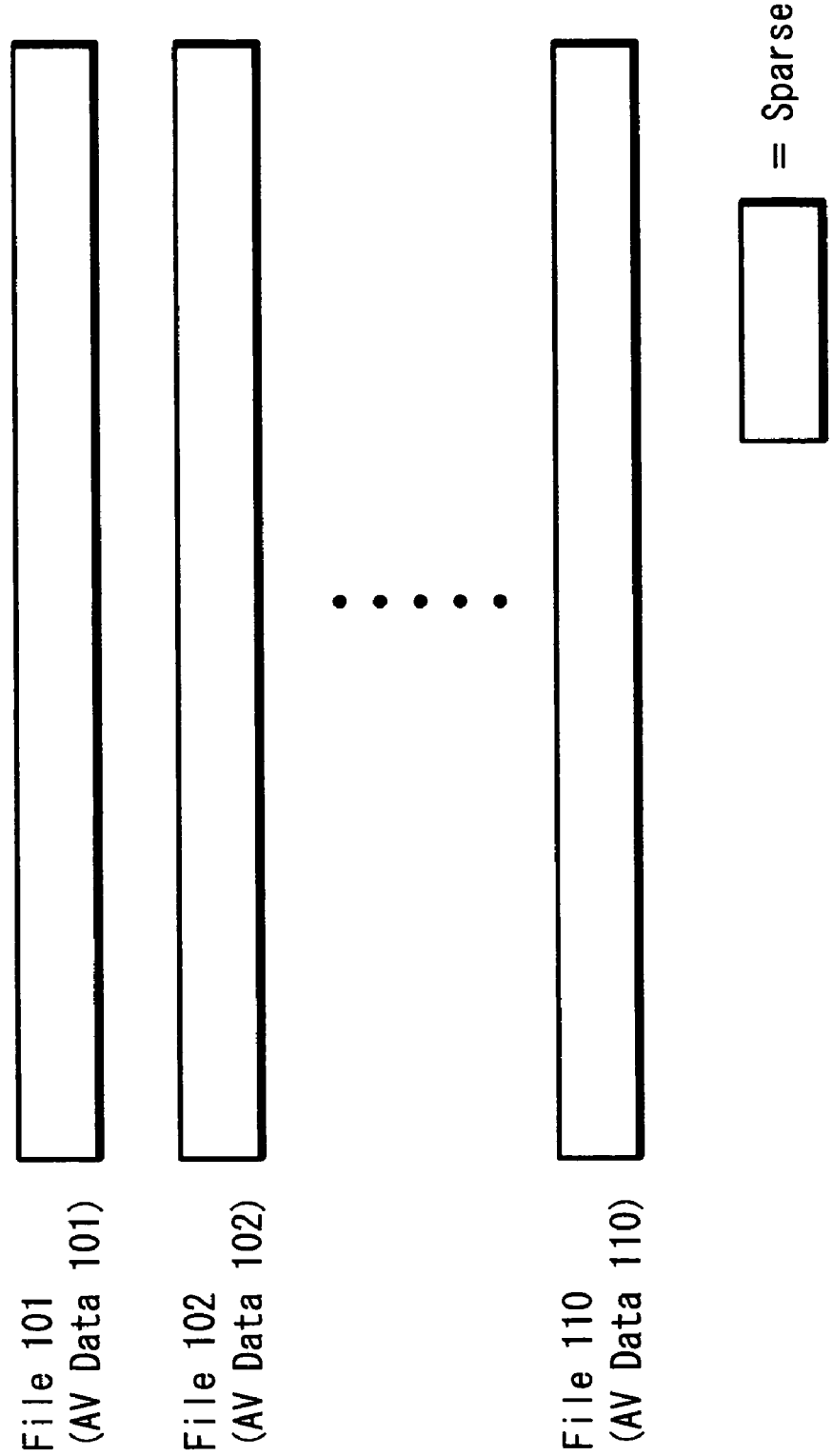
FIG. 12 is a drawing illustrating examples of files that are formed in the SSD of FIG. 1 or FIG. 4.

Then, by the processing of step S1 in FIG. 9 of the material management software in the edit terminal, with respect to those various kinds of AV data, empty files that have the sparse area of the same amount as the AV data amount are formed in the SSD, respectively. For example, FIG. 12 shows a state in which files 101 to 110 for each of the AV data 101 to 110 were formed in the SSD, because ten kinds of AV data 101 to 110 were designated as the editing object.

At this point, a sum of the physical size of files 101 to 110 becomes equal to a sum of the amount of data of AV data 101 to 110 (for example, if the amount of data of each of the AV data 101 to 110 is 20 gigabyte, the sum of the physical size becomes 200 gigabyte), however, because the sum of the physical size of files 101 to 110 is zero, all of the files 101 to 110 can be made to exist in the SSD.

Next, those various kinds of AV data designated by the edit terminal are reproduced sequentially in the AV server and are transmitted to the SSD via the gateway terminal to be recorded in the corresponding files within the SSD, at the steps S11 and S12 of the processing of FIG. 10 and at the steps S2 and S3 of the processing of FIG. 9 of the material management software.

Figure 13:
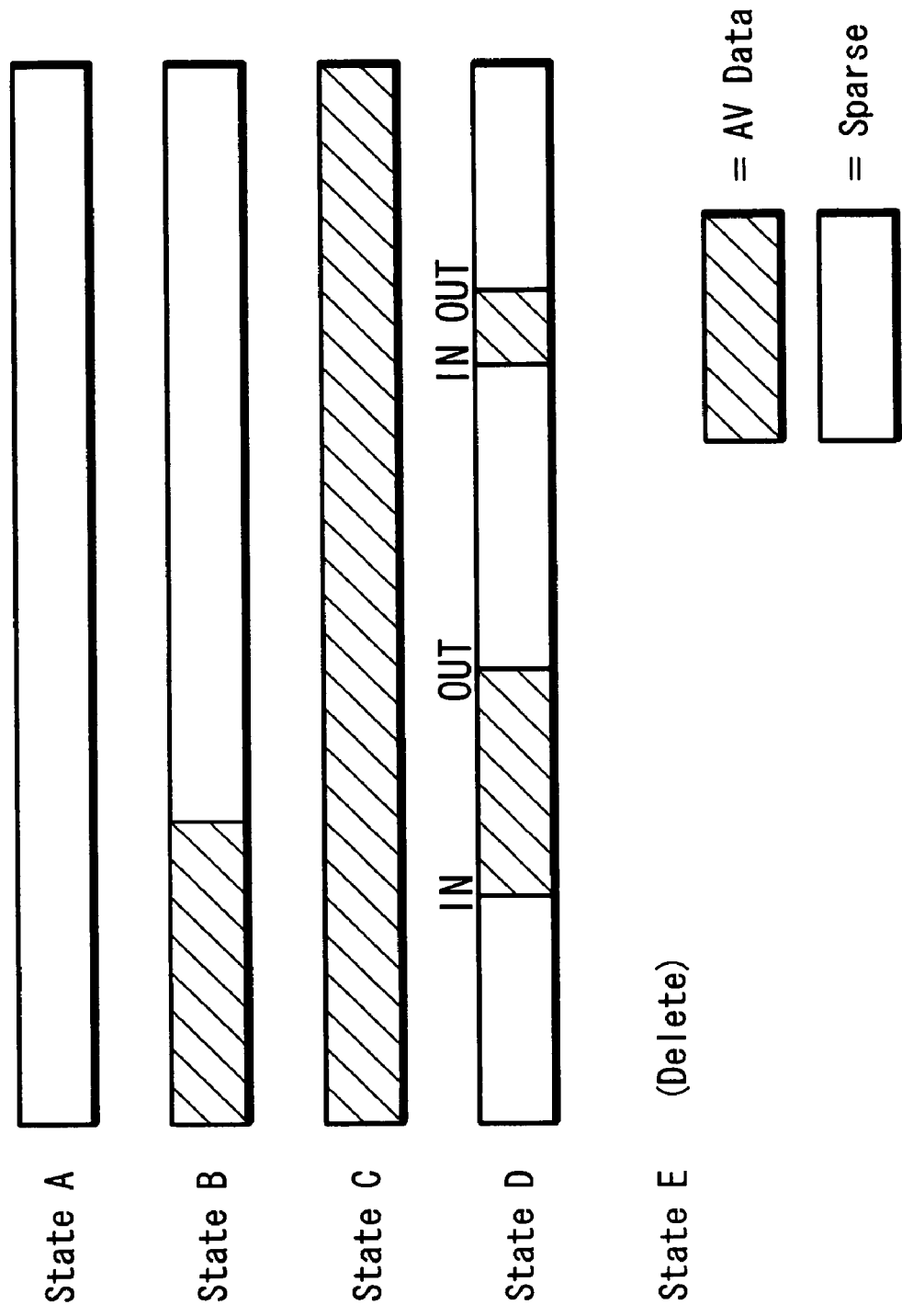
FIG. 13 is a drawing showing an example of the change of a state of a file formed in the SSD of FIG. 1 or FIG. 4.

FIG. 13 is a drawing showing an example of state change after forming a file by selecting any one of the files formed in the SSD at the step S1 of the processing of FIG. 9.

In FIG. 13, the state A is the state at the point where the file is made (state in which the whole file is a sparse area). The state B is the state in which AV data is written in at the steps S11 and S12 of the processing of FIG. 10 and at the steps S2 and S3 of the processing of FIG. 9.

When an operator of the edit terminal accesses the frame in which AV data has already been written in this file of the SSD on the time line after the point entering the state B, the AV data subsequent to that frame is read out from the SSD to the edit terminal. Therefore, the operator can start editing by previewing AV data from that frame.

The state C shows the state in which the writing of the AV data until the end of the file of the SSD has been completed (that is, all the AV data for the edit was copied from the AV server to the SSD). The operator of the edit terminal can preview the AV data for the edit to the end of frames in this state C.

Then, when the operator determines the necessary extent on the time line by the IN point and the OUT point, a portion where the AV data other than the area from the determined IN point to the OUT point was written (namely, unnecessary data for the edit) in this file of the SSD is changed to the sparse area at the steps S21 and S23 of the processing of FIG. 11 of the material management software, which is shown in FIG. 13 as the state D.

Accordingly, the free area in the SSD increases automatically and promptly by the sparse area.

After that, the editing is ended when the operator executes pasting on the time line and the operation of registering the editing result is executed, the editing result is registered in the AV server at the steps S22, S24 and S25 of the processing in FIG. 11 of the material management software, and because this file inside the SSD is erased, shown as the state E in FIG. 13, the free area in the SSD increases furthermore.

In the state B, if a sum of the physical size of this file in the SSD (the data amount of the AV data written in this file) and the physical size of files in SSD in which the writing of the AV data is previously completed (the data amount of the AV data written in those files) reaches the capacity of the SSD, the writing of the AV data into this file of the SSD is temporarily stopped at the steps S13 and S16 of the processing of FIG. 10 and at the steps S4 and S7 of FIG. 9 of the material management software.

However, with respect to the AV data of this file, the writing of which has already been completed, if the operator determines the necessary area for the edit by the IN point and the OUT point on the time line, in this file the writing of which has been completed a portion where AV data other than the determined area from the IN point to the OUT point is made to be the sparse area (the steps S21 and S23 of the processing in FIG. 11), so that the free area of the SSD increases automatically and promptly by the amount of this sparse area.

Therefore, the processing proceeds promptly to the steps S17 and S18 of the processing in FIG. 10 and the steps S8 and S9 in the processing of FIG. 9 from the step S16 of the processing in FIG. 10 and the step S7 of the processing in FIG. 9 to resume the writing of the AV data to this file in the SSD.

Figure 14:
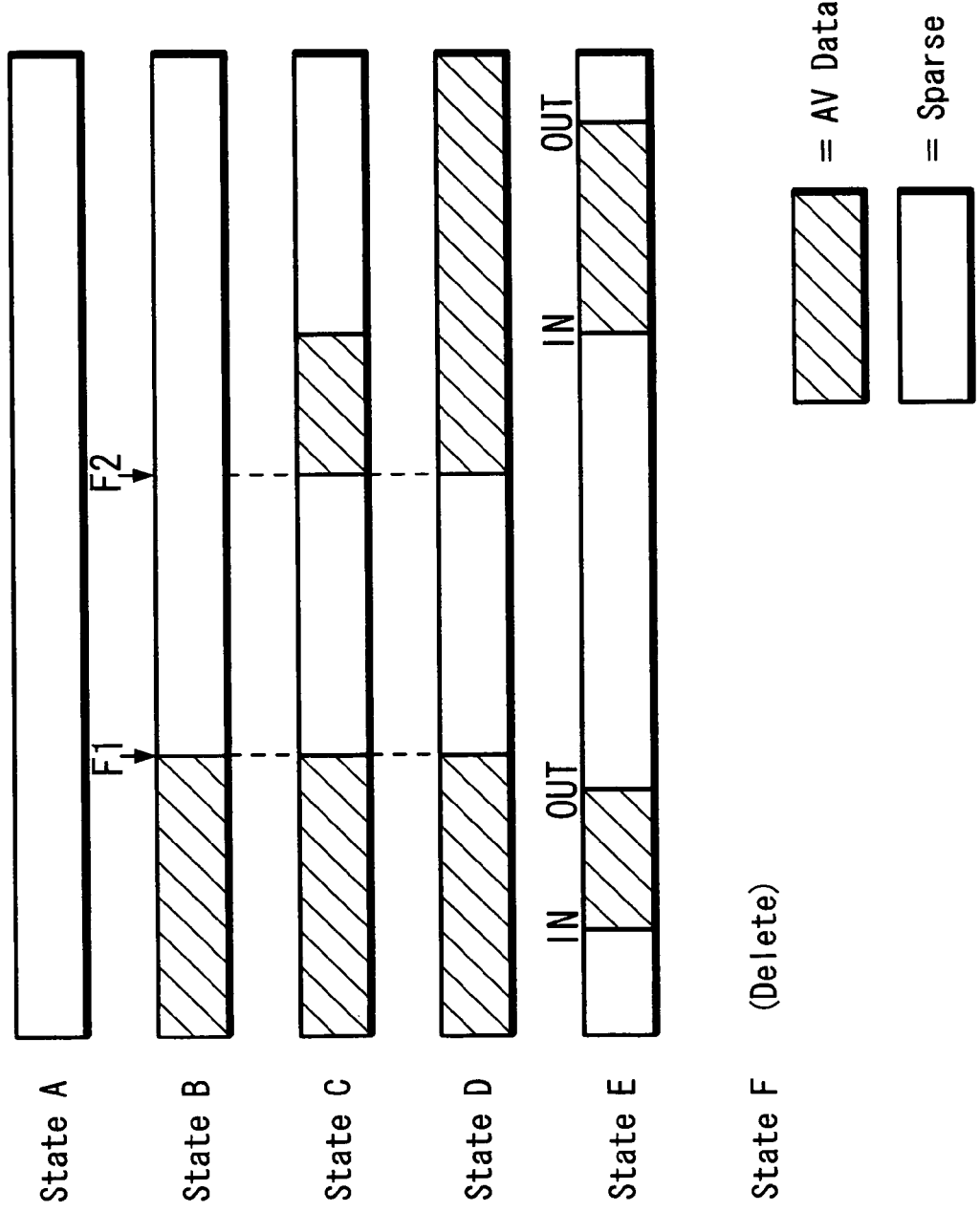
FIG. 14 is a drawing showing another example of the change of a state of a file formed in the SSD of FIG. 1 or FIG. 4.

FIG. 14 is a drawing showing another example of state change after forming a file by selecting any one of the files formed in the SSD at the step S1 of the processing in FIG. 9.

In FIG. 14, the states A, B, E and F correspond to the states A, B, D and E of the examples in FIG. 13, respectively.

In the state B of FIG. 14, after AV data was written in the file in the SSD from the first frame to the frame F1, since an operator of the edit terminal knows that the AV data of the portion from the frame F1 to the frame immediately before the frame F2 is not necessary for editing, when accessing the frame F2 (frame that AV data has not been written in the file inside SSD yet), at the steps S14 and S19 of the processing in FIG. 10 and at the steps S5 and S10 of the processing in FIG. 9 the portion from the frame F1 to the frame immediately before the frame F2 is skipped and AV data subsequent to the frame F2 is reproduced from the AV server, and the writing position of AV data to the file in the SSD is changed to the portion of the sparse area starting from the frame F2.

The state C of FIG. 14 shows the state in which the writing position of AV data to the file in the SSD was changed as described above. Accordingly, AV data subsequent to the frame F2 is read out from the SSD to the edit terminal on a priority basis, so that the operator can preview AV data subsequent to the frame F2 promptly to be edited.

The state D of FIG. 14 shows the state in which after the writing position was changed in this way, the writing of AV data to the end of this file in the SSD was completed.

As mentioned above, when this SSD is used, because AV data of each kind designated in the edit terminal among AV data stored in the AV server is copied as the sparse file respectively, various kinds of AV data for the edit in AV data stored in the AV server, can be copied to the SSD of the small capacity.

Further, even if no free area is available in the SSD while copying, the portion where AV data unnecessary for the edit was written among the sparse files is changed into the sparse area, so that the free area of the SSD increases automatically and promptly to resume the copying.

Accordingly, various kinds of AV data for the edit stored in the AV server can be copied to the SSD of the small capacity and can be edited in the edit terminal efficiently.

Furthermore, as shown in FIG. 14 as the state C, in the case where the operator of the edit terminal understands in advance that a particular portion of AV data in the AV data for the edit is necessary for editing (for example, AV data stored in the AV server sent from a video camera of on-the-spot coverage to a broadcast station via a wide area network), if the operation of accessing to the portion where the necessary AV data is written in the sparse area of the file in the SSD is executed, the AV data of that necessary portion among the AV data for the edit is copied to the SSD on the priority basis.

Therefore, because the necessary portion for the edit can be copied to the SSD promptly and be read by the edit terminal, the edit can furthermore be performed efficiently.

Note that, in this embodiment, when the frame in which AV data has not been written in the file of the SSD is accessed on the time line, AV data subsequent to the frame to the end are written into the file of the SSD on a priority basis (the steps S14 and S19 of the processing in FIG. 10, the steps S5 and S10 of the processing in FIG. 9 and the states C and D of FIG. 14). However, as another embodiment, by accessing two frames (the start frame and end frame) in which AV data have not been written in the files of the SSD yet, AV data from the start frame to the end frame may be written into the file of the SSD on a priority basis.

Further, in this embodiment, the material management software is installed in the edit terminal itself. However, as another embodiment, the material management software may be installed in another computer separately from the edit terminal, and the processing in FIGS. 9 to 11 may be requested from the edit terminal based on the operation of the edit terminal.

Accordingly, because all the processing for copying AV data to the SSD from the AV server is executed by another computer, the load to the edit terminal can be reduced.

An Embodiment Using the SSD Including an Access Control Function

Next, further another specific example of the SSD (and the processing of the edit terminal corresponding thereto) suitable for use in a system in which a plurality of edit terminals are connected to one SSD as shown in the example of FIG. 4.

Figure 15:
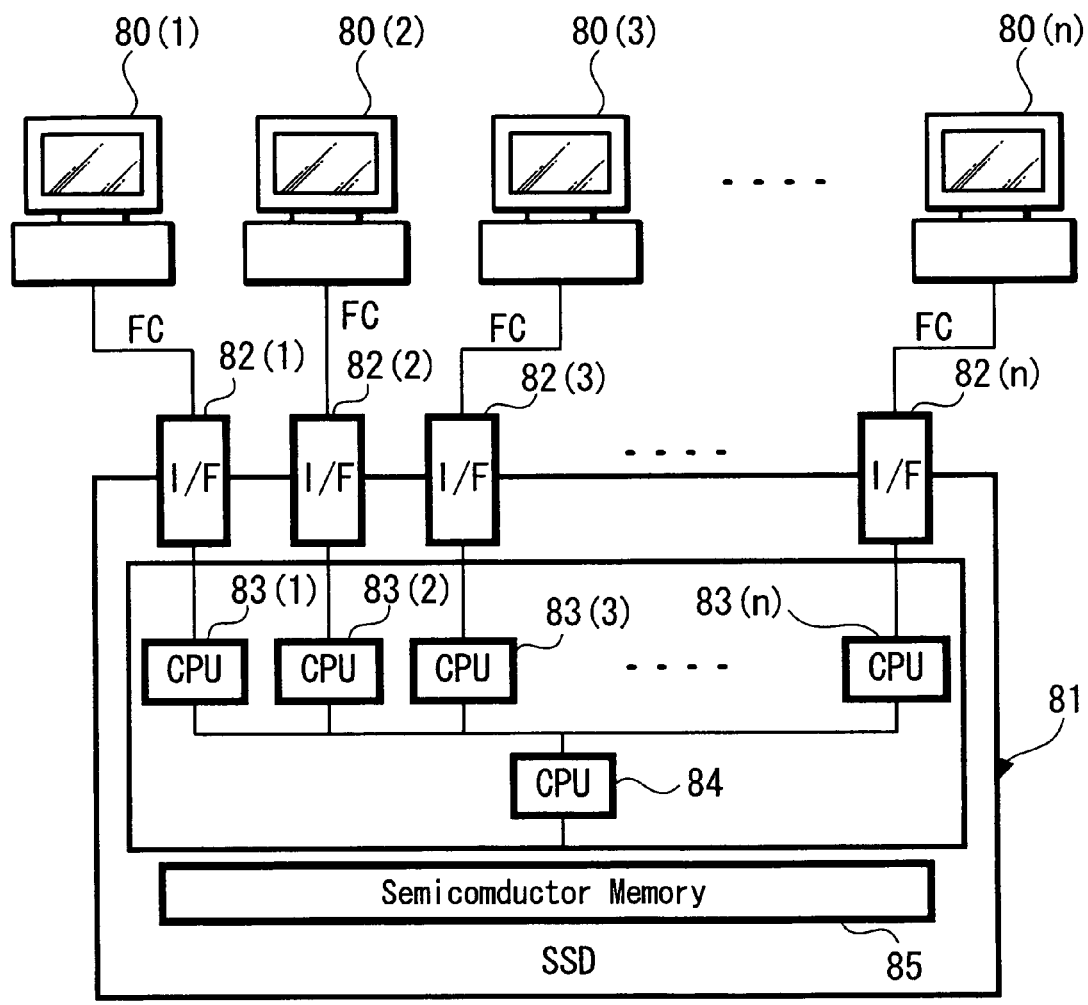
FIG. 15 is a block diagram showing an example of the configuration of the SSD of FIG. 1 or FIG. 4.

FIG. 15 is a block diagram showing an example of the configuration of such SSD. In SSD 81, input and output interfaces 82(1) to 82($n$) of n units (four or more units) of the fiber channels are provided. Therefore, in this SSD 81, the n units of computers 80(1) to 80($n$) can be connected to the input and output interfaces 82(1) to 82($n$), respectively.

Further, CPUs 83(1) to 83($n$) corresponding to the input and output interfaces 82(1) to 82($n$) one by one, a CPU 84 for controlling a semiconductor, and a semiconductor memory 85 (for example, SDRAM having the capacity of several ten gigabyte) are provided in the SSD, 81.

Each of the CPUs 83(1) to 82($n$) (hereinafter describes as the CPU 83) executes the processing shown in FIG. 16 in this processing, at first, the judgment of whether or not the preservation request of the file, in which the logical address corresponding to the data size (for example, if the data size is p megabyte, the addresses are 0 to p) is designated, is input to the corresponding input and output interfaces 82(1) to 82($n$) (hereinafter describes as the input and output interface 82) (step S1), the judgment of whether or not the request for reading the file is input to the input and output interface 82 (step S2), and the judgment of whether or not the request of deleting file is input to the input and output interface 82 (step S3), are repeated until "YES" is obtained at one of those steps.

When "YES" is obtained at the step S, the data size is notified to the CPU 84 that is a CPU for the control of the semiconductor memory 85, and the search for the free area in the semiconductor memory corresponding to the data size is requested to the CPU 84 (step S4).

Figure 17:
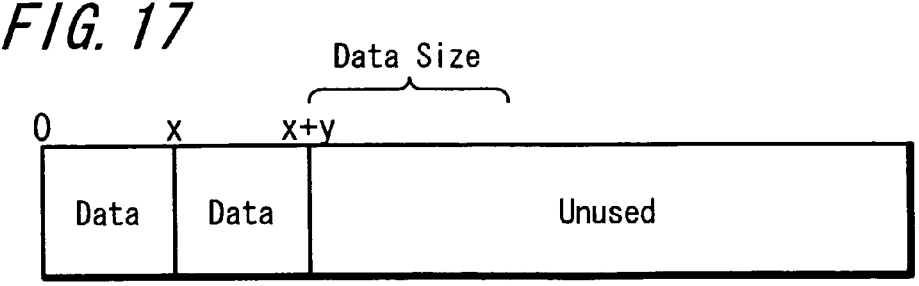
FIG. 17 is a drawing showing the storage area of a semiconductor memory of FIG. 15.

After receiving this request, the CPU 84 searches an area corresponding to that data size from the unused memory area of the semiconductor memory. For example, as shown in FIG. 17, the data of files are stored in the areas of addresses 0 to x and addresses (x+1) to (x+y) respectively in the memory area of the semiconductor memory 85, and if areas subsequent to an address (x+y+1) are not used, areas corresponding to the data size is searched in the areas subsequent to address (x+y+1).

Subsequently, whether or not the CPU 84 found a free area corresponding to that data size is judged (step S5). If "YES" is obtained, the transmission, from the computer (for example, a computer connected to the input and output interface 82(1) for the CPU 83(1) and is a computer 80(1) in the example of FIG. 15) that has transmitted the preservation request, of the data of the file to which the preservation request is made is requested through the input and output interface 82. (step S6)

Next, data of this file received through the input and output interface 82 is sent to the CPU 84, and request to write this data into the free area of the semiconductor memory 85 that was found at step s5 is made to the CPU 84 (step S7).

Subsequently, the address of this free area of the semiconductor memory 85 is stored with corresponding the address to this file (step S8). Then, the preservation completion is notified through the input and output interface 82 to the computer that transmitted the preservation request (step S9), and the processing returns to the step S1.

If "NO" is obtained at step 5 (a free area is not found), the fact that it is impossible to write data into the computer that sent the file preservation request is notified (step S10), and the processing returns to step S1.

If "Yes" is obtained at step 2, the address of the semiconductor memory 85 corresponding to the file to which the request for reading is made (the address stored at step S8, when preserving the file) is designated, and request to read the data from the address area of the semiconductor memory 85 is made to the CPU 84 (step S11).

Then, data read out from the semiconductor memory 85 by the CPU 84 is transmitted to the computer that sent the request of reading through the input and output interface 84 (step S12), and the processing returns to step S1.

If "Yes" is obtained at step 3, the address of the semiconductor memory 85 corresponding to the file to which the request of deleting is made (the address stored at step S8, when preserving the file) is designated, and requests to delete the data of that address area of the semiconductor memory 85 is made to the CPU 84 (step S13).

Then, after the data is deleted, the fact that the deletion was completed is notified to the computer that sent the request of deletion (step S14), and the processing returns to step S1.

In this SSD 81, when not the access request directly designating the physical address of the semiconductor memory 85 but the access request designating the logical address is input to one of the plurality of input and output interfaces 82(1) to 82($n$), then the logical address is converted to the physical address of the semiconductor memory 85 by the CPU that was provided corresponding to the input and output interface out of the CPUs 83(1) to 83($n$), and access is made to the converted physical address area of the semiconductor memory 85 through the CPU 84.

Therefore, as shown in FIG. 15, when the separate computers 80(1) to 80($n$) are connected to the input and output interfaces 82 (1) to 82($n$) respectively and the access request designating the logical address is made from each of the computers 80(1) to 80($n$), these logical addresses are converted into the physical addresses of the areas of the semiconductor memory 85 that are not mutually overlapped and the data writing is executed, so that the destruction of the data can be prevented.

As described above, in this SSD 81, if a plurality of computers are connected thereto, the destruction of the data can be prevented without providing the computer that controls the access to the SSD 81 of those computers.

Next, the processing, in the case of using this SSD 81 as the SSD 42 of the system in FIG. 4 (each of edit terminals 41 and gateway terminal 43 are connected to separate individual input and output interfaces 82), executed by the edit terminal and gateway terminal is explained.

First, when the request to transfer the AV data file to be edited to the SSD 81 is sent to the gateway terminal from one of the edit terminals via the Ethernet (Ethernet 45 shown in FIG. 4), then the gateway terminal makes AV data of that file transmitted to the gateway terminal from the AV server (AV server 44 in FIG. 4). Further, the preservation request of the file designating the logical address corresponding to the data size of the AV data (for example, if the data size is p megabyte, the addresses are 0 to p) is sent to the input and output interface 82 of the SSD 81 to which the gateway terminal is connected.

Figure 16:
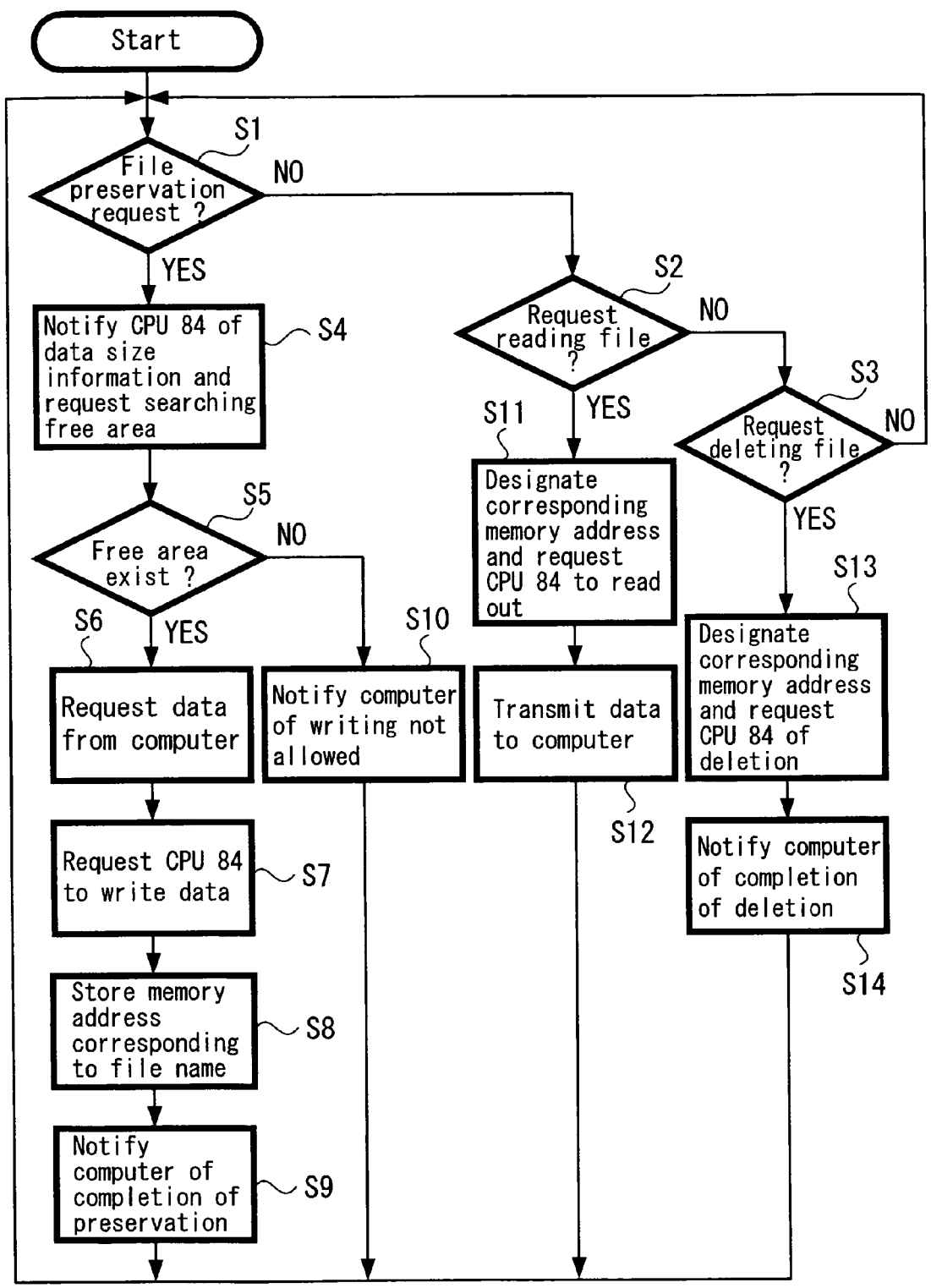
FIG. 16 is a flow chart showing the processing executed by each of CPUs 83(1) to 83(n) of FIG. 15.

In the SSD 81, based on this preservation request, the steps S1, S4 and S5 of the processing in FIG. 16 are executed by the CPU 83 provided corresponding to the input and output interface 82. Then, if there is a free areas corresponding to that data size, the data transmission from the gateway terminal of the file, to which the preservation request is made, is requested (steps S5 and S6).

Based on this request, the gateway terminal sends AV data sent from the AV server to the input and output interface 82 of the SSD 81. In the SSD 81, by the CPU 83 corresponding to the input and output interface 82, the AV data is written into the semiconductor memory 85 and then, the fact that the preservation was completed is notified to the gateway terminal (steps S7 to S9 in FIG. 16). Accordingly, the AV data file designated by the operator is transferred to the SSD 81 from the AV server.

Next, when the operation of reading AV data in the SSD 81 is executed by the edit terminal, then the request of reading the file is sent to the input and output interface 2 of the SSD 81 to which the edit terminal is connected.

In the SSD 81, based on this request of reading, by the CPU 83 corresponding to the input and output interface 82, the steps S2, S11 and S12 of the processing in FIG. 16 are executed. Thus, AV data is sent to the edit terminal from the SSD 81, so that the editing can be performed by previewing the AV data by the edit terminal.

Subsequently, when the operation of writing the edited AV data into the SSD 81 is executed in the edit terminal, then the edit terminal sends the preservation request designating the logical address corresponding to the data size of the edited AV data to the input and output interface 82 of the SSD 81.

In the SSD 81, based on this preservation request, by the CPU 83 provided corresponding to the input and output interface 82, the steps S1, S4 and S5 of the processing in FIG. 16 are executed. Then, if there is a free area corresponding to the data size, the data transmission from that edit terminal of the file to which the preservation request is made is requested (steps S5 and S6).

Based on this request, the edit terminal sends the edited AV data to the input and output interface 82 of the SSD 81. In the SSD 81, by the CPU 83 provided corresponding to the input and output interface 82, the edited AV data is written into the semiconductor memory 85 and then, the fact that the preservation was completed is notified to the edit terminal (steps S7 to S9 in FIG. 16). Hence, the edited AV data is written into the SSD 81.

As described above, based on the access request designating the logical address respectively from the gateway terminal connected to the SSD 81 and each of the edit terminals, the SSD 81 converts those logical addresses into the physical addresses of the areas of semiconductor memory that are not mutually overlapped, so that the destruction of the data can be prevented without providing the computer that controls the access to the gateway terminal and the SSD 81 of each edit terminal.

Accordingly, the editing can be performed by previewing AV data quickly by each edit terminal without incurring the enlargement and complication of the system.

Furthermore, because the processing based on the access request that is input to each input and output interface 82 of the SSD 81 from the edit terminal and gateway terminal is executed by separate CPU 83 simultaneously in parallel, the reading and writing of data in the SSD 81 based on the access request from the edit terminal and gateway terminal can be executed in shorter time, consequently, the editing can be performed further quickly.

DESCRIPTION OF PREVIEW NUMERALS

1 . . . AV SERVER
2 . . . AV SERVER OF LOW RESOLUTION
3(1) to 3(N) . . . EDIT TERMINAL
4(1) to 4(N) . . . SSD
5 . . . GATEWAY TERMINAL
6 . . . FC SWITCH
7 . . . ETHERNET
41 . . . EDIT TERMINAL
42 . . . SSD
43 . . . GATEWAY TERMINAL
44 . . . AV SERVER
45 . . . ETHERNET
46 . . . FC SWITCH
81 . . . SSD
82(1) to 82(n) . . . INPUT/OUTPUT INTERFACE
83(1) to 83(n)
84 . . . CPU
85 . . . SEMICONDUCTOR MEMORY

The invention claimed is:

1. A system for previewing and editing audio/video (AV) data, comprising:
 a first AV server storing AV data and having a recording means;
 a second AV server storing compressed AV data, the compressed AV data containing content corresponding to the AV data stored on the first AV server;
 a plurality of edit terminals for selecting AV data from the first AV server, previewing compressed AV data from the second server that corresponds to the selected AV data, identifying a portion of the AV data in the first server corresponding to a portion of the previewed compressed AV data, and editing the portion of identified AV data from the first server;
 a recording apparatus connected to the plurality of edit terminals for storing AV data from the first AV server, wherein the plurality of edit terminals access the recording apparatus at higher access speeds than the access speeds at which the plurality of edit terminals can access the recording means on the first AV server,
 wherein each of the plurality of edit terminals includes a first processing means, a second processing means, and a third processing means;
 the first processing means for previewing compressed AV data corresponding to the AV data selected from the first AV server;
 the second processing means for sending a transfer request to transfer the identified portion of the AV data from the first AV server to the recording apparatus; and the third processing means for previewing and editing the identified portion of AV data from the first AV server that is being stored at the recording apparatus;

a first control means for causing the recording apparatus to instantiate a file which is empty and contains a sparse area of the same size as the data size of a designated AV data, the designated AV data being AV data stored in the first AV server that has been edited by at least one of the plurality of edit terminals;

a second control means for causing the first AV server to reproduce the designated AV data and to transmit the designated AV data to the recording apparatus, wherein the second control means further causes the first AV server to temporarily stop reproducing the designated AV data in response to a signal from the recording apparatus that no free area exists in the recording apparatus, and to resume reproducing the designated AV data in response to a signal indicating that free area exists in the recording apparatus;

a third control means for causing the recording apparatus to write the designated AV data transmitted from the first AV server into the file, and wherein the third control means temporarily stops writing in response to a signal indicating that no free area exists in the recording apparatus, and to resume writing in response to a signal indicating that free area exists in the recording apparatus; and a fourth control means for causing the recording apparatus to make a sparse area in the file, based on an edit made by at least one the plurality of edit terminals;

wherein the second control means controls the first AV server to reproduce the designated AV data that should be written into the accessed portion of the file in the recording apparatus on a priority basis based on the accessing of the sparse area in the file by the plurality of edit terminals, and wherein the third control means controls the recording apparatus to write the designated AV data into the accessed portion of the file in the recording apparatus on a priority basis based on the fact that a portion of the sparse area in the file was accessed by the plurality of edit terminals.

2. The system for previewing and editing AV data according to claim 1, wherein the recording apparatus comprises:
a plurality of fiber channel ports; and
a gateway terminal, connected to the recording apparatus and the first AV server, which transfers AV data from the first AV server to the recording apparatus based on a request from the second processing means from at least one of the plurality of edit terminals.

3. The system for previewing and editing AV data according to claim 2,
wherein the gateway terminal records editing information into a file, the editing information indicating the portion of the AV data in the first AV server that was edited; and
wherein the third processing means in each of the plurality of edit terminals previews AV data indicated by the editing information in the file.

4. The system for previewing and editing AV data according to claim 1, wherein the recording apparatus is connected to the plurality of edit terminals.

5. The system for previewing and editing AV data according to claim 1, wherein
the first AV server includes a synchronous input and output port, and the second processing means in each of the plurality of edit terminals makes a request to transfer AV data from the input and output port of the first AV server to the recording apparatus.

6. The system for previewing and editing AV data according to claim 1, wherein the recording apparatus includes:
a plurality of input and output interfaces,
a semiconductor memory,
a memory control means which controls the semiconductor memory, and
a fourth processing means which converts a logical address into a physical address of the semiconductor memory based on an access request designating the logical address as input to the input and output interfaces, and through the memory control means, which accesses the converted physical address area of the semiconductor memory; and
wherein each of the plurality of edit terminals and transfer means which transfers AV data stored in the first AV server to the recording apparatus are separately connected to the input and output interfaces respectively, and an access request designating the logical address is transmitted to the recording apparatus.

7. The system for previewing and editing AV data according to claim 6, wherein
the fourth processing means in the recording apparatus
causes the memory control means to search for a free area in the semiconductor memory corresponding to the data size based on the fact that a file preservation request designating the logical address corresponding to the data size was input to the input and output interface,
requests to transmit data from the file, through the input and output interface, to a transmission source of the preservation request when the free area exists,
writes the data of the file received through the input and output interface into the free area in the semiconductor memory by the memory control means, and
stores an address of the free area in the semiconductor memory, corresponding to the file; and
the transfer means and each of the plurality of edit terminals designate a logical address corresponding to a data size, when a file preservation request is made to the recording apparatus.

8. The system for previewing and editing AV data according to claim 6, wherein the recording apparatus has a plurality of the fourth processing means, corresponding to each of the input and output interfaces.

9. A method for previewing and editing AV, comprising:
a first previewing step of previewing selected AV data from a second AV server by at least one of a plurality of edit terminals, the AV data from the second AV server being a compressed copy of AV data as in a first AV server;
an identifying step of identifying a portion of the AV data in the first server corresponding to a portion of the AV data previewed in the first previewing step;
a requesting step, wherein the at least one of the plurality of edit terminals requests transfer of the identified portion of the AV data from the first AV server to a recording apparatus, the recording apparatus being connected to the plurality of edit terminals and wherein the plurality of edit terminals are capable of higher speed access with the recording apparatus than with a recording means in the first AV server, and
a second previewing step of previewing AV data from the first server being stored at the recording apparatus by at least one of the plurality of edit terminals; and an editing step of editing the AV data at the recording apparatus by at least one of the plurality of edit terminals;

an instantiating step of instantiating a file at the recording apparatus, the file being empty and having a sparse area the same size as the data amount of a designated AV data, the designated AV data being designated by at least one of the plurality of edit terminals;

a reproducing step of reproducing the designated AV data and transmitting the designated AV data to the recording apparatus, including temporarily stopping the reproduction of the designated AV data when no free area exists in the recording apparatus, and resuming reproduction of the designated AV data when a free area exists in the recording apparatus;

a writing step including writing the designated AV data, transmitting from the first AV server, into the file, temporarily stopping the writing if no free area exists in the recording apparatus, and resuming writing when a free area exists in the recording apparatus; and a sparse area making step, performed by a fourth control means, of causing the recording apparatus to make a sparse area in the file, based on an edit made by the at least one of the plurality of edit terminals;

wherein the reproducing step includes reproducing the designated AV data into the accessed portion of file in the recording apparatus on a priority basis based on the accessing of the sparse area in the file by the plurality of edit terminals, and wherein the writing step includes writing the designated AV data into the accessed portion of the file in the recording apparatus on a priority basis based on the fact that a portion of the sparse area in the file was accessed by the plurality of edit terminals.

10. The method for previewing and editing AV data according to claim 9, wherein each of the plurality of edit terminals is connected to the recording apparatus via a plurality of fiber channel ports;

wherein the requesting step includes sending a request to a gateway terminal connected to the first AV server; and further comprising a transferring step, wherein the gateway terminal causes the first AV server to transfer AV data to the recording apparatus based on the requesting step.

11. The method for previewing and editing AV data according to claim 10, further comprising:

a data transfer step where identified AV data is written to a file by the gateway terminal based on the transfer request from the requesting step, the transfer request containing instructions indicating a portion of AV data from the first server which is to be written to the recording apparatus.

12. The method for previewing and editing AV data according to claim 9, wherein the first AV server includes a synchronous input and output port, and wherein the requesting step further includes a request to transfer AV data to the recording apparatus from the input and output port of the first AV server.

13. A system for previewing and editing audio/video (AV) data, comprising:

a first AV server storing AV data and having a recording means;

a second AV server storing compressed AV data, the compressed AV data corresponding to the AV data stored on the first AV server, a plurality of edit terminals for selecting AV data from the first AV server, previewing compressed AV data from the second server that corresponds to the selected AV data, identifying a portion of the AV data in the first server corresponding to portions of the previewed compressed AV data and editing the portion of identified AV data from the first server;

a plurality a recording apparatuses connected to the plurality of edit terminals, wherein each of the plurality of edit terminals is connected to a single corresponding recording apparatus for storing AV data from the first AV server, and each corresponding recording apparatus is connected to a single corresponding one of the plurality of edit terminals, and a given edit terminal can access its corresponding recording apparatus at a higher access speed than the given edit terminal can access the recording means on the first AV server, wherein each of the plurality of edit terminals includes a first processing means, a second processing means, and a third processing means;

the first processing means for previewing compressed AV data from the second AV server corresponding to the AV data selected from the first AV server;

the second processing means for sending a transfer request to transfer the identified portion of the AV data from the first AV server to the recording apparatus corresponding to the edit terminal; and the third processing means for previewing and editing the identified portion of the AV data from the first AV server that is being stored at the corresponding recording apparatus;

a first control means for causing the corresponding recording apparatus to instantiate a file which is empty and contains a sparse area of the same size as the data size of a corresponding AV data, the corresponding AV data being AV data stored in the first AV server that has been edited by at least one of the plurality of edit terminals;

a second control means for causing the first AV server to reproduce the corresponding AV data and to transmit the corresponding AV data to the corresponding recording apparatus, wherein the second control means further causes the first AV server to temporarily stop reproducing the corresponding AV data in response to a signal from the corresponding recording apparatus that no free area exists in the recording apparatus, and to resume reproducing the corresponding AV data in response to a signal indicating that free area exists in the corresponding recording apparatus;

a third control means for causing the corresponding recording apparatus to write AV data transmitted from the first AV server into the file, and wherein the third control means temporarily stops writing in response to a signal indicating that no free area exists in the corresponding recording apparatus, and to resume writing in response to a signal indicating that free area exists in the corresponding recording apparatus; and a fourth control means for causing the corresponding recording apparatus to make a sparse area in the file, based on an edit made by the plurality of edit terminals;

wherein the second control means controls the first AV server to reproduce AV data that should be written into the accessed portion of the file in the corresponding recording apparatus on a priority basis based on the accessing of the sparse area in the file by the plurality of edit terminals, and wherein the third control means controls the corresponding recording apparatus to write AV data into the accessed portion of the file in the corresponding recording apparatus on a priority basis based on the fact that a portion of the sparse area in the file was accessed by the plurality of edit terminals.

* * * * *